United States Patent
Kim et al.

(10) Patent No.: US 12,075,353 B2
(45) Date of Patent: *Aug. 27, 2024

(54) CONFIGURABLE POWER SAVING SIGNAL WITH MULTIPLE FUNCTIONALITIES IN 5G NR

(71) Applicant: Apple Inc., Cupertino, CA (US)

(72) Inventors: Yuchul Kim, San Jose, CA (US); Wei Zeng, San Diego, CA (US); Haitong Sun, Irvine, CA (US); Dawei Zhang, Saratoga, CA (US); Jia Tang, San Jose, CA (US); Yang Li, Plano, TX (US); Zhu Ji, San Jose, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,282

(22) Filed: Jan. 23, 2023

(65) Prior Publication Data

US 2023/0164693 A1 May 25, 2023

Related U.S. Application Data

(63) Continuation of application No. 16/835,579, filed on Mar. 31, 2020, now Pat. No. 11,564,167.
(Continued)

(51) Int. Cl.
*G08C 17/00* (2006.01)
*H04B 7/0413* (2017.01)
(Continued)

(52) U.S. Cl.
CPC ...... *H04W 52/0216* (2013.01); *H04B 7/0413* (2013.01); *H04L 5/0053* (2013.01); *H04W 52/0206* (2013.01); *H04W 74/006* (2013.01)

(58) Field of Classification Search
CPC ............. H04W 52/02; H04W 52/0216; H04W 84/12; H04W 52/0229; H04W 84/18;
(Continued)

(56) References Cited

U.S. PATENT DOCUMENTS 9,237,522 B2   1/2016   Golitschek Edler Von Elbwart
9,432,992 B2   8/2016   Jang
(Continued)

FOREIGN PATENT DOCUMENTS

CN   108292987   7/2018
EP   2595425    5/2013
(Continued)

OTHER PUBLICATIONS

European Search Report in EP application No. 20167508.9-1212 issued Jul. 30, 2020, 10 pages.
(Continued)

*Primary Examiner* — Phuongchau Ba Nguyen
(74) *Attorney, Agent, or Firm* — Kowert, Hood, Munyon, Rankin & Goetzel, P.C.

(57) ABSTRACT

Apparatuses, systems, and methods for a wireless device to perform methods for configuring a power savings signal in fifth generation (5G) new radio (NR) networks. The wireless device may transmit, to a base station within a network, power savings requirements and receiving, from the base station, a configuration of a power saving signal, where the configuration indicates one or more functionalities of the power saving signal. The wireless device may periodically receive, from the base station, the power saving signal and interpret the power saving signal based on the configuration. The configuration of the power saving signal may be received via radio resource control signaling.

20 Claims, 27 Drawing Sheets

Related U.S. Application Data

(60) Provisional application No. 62/827,810, filed on Apr. 1, 2019, provisional application No. 62/828,735, filed on Apr. 3, 2019.

(51) Int. Cl.
  *H04L 5/00* (2006.01)
  *H04W 52/02* (2009.01)
  *H04W 74/00* (2009.01)

(58) Field of Classification Search
  CPC ........... H04W 52/0206; H04W 74/006; H04W 52/028; H04W 52/0212; H04W 52/0235; H04W 72/1289; H04B 7/0413; H04L 5/0053; Y02D 30/70
  See application file for complete search history.

(56) References Cited

U.S. PATENT DOCUMENTS

| | | | |
|---|---|---|---|
| 9,872,252 | B1 | 1/2018 | Ang |
| 10,123,266 | B2 | 11/2018 | Wang |
| 10,901,478 | B2 * | 1/2021 | Nam ................... G06F 1/3209 |
| 11,297,574 | B2 | 4/2022 | Liao |
| 11,564,167 | B2 * | 1/2023 | Kim ..................... H04L 5/0053 |
| 2016/0128128 | A1 * | 5/2016 | Ang ..................... H04W 76/28 |
| | | | 370/311 |
| 2016/0142974 | A1 | 5/2016 | Lindoff |
| 2018/0255117 | A1 | 9/2018 | Ljung |
| 2018/0279223 | A1 | 9/2018 | Kim |
| 2018/0309513 | A1 | 12/2018 | Kim |
| 2018/0359689 | A1 | 12/2018 | Lee |
| 2018/0367289 | A1 | 12/2018 | Kim |
| 2018/0368112 | A1 | 12/2018 | Sebeni |
| 2019/0254110 | A1 * | 8/2019 | He ....................... H04L 5/0048 |
| 2019/0281546 | A1 | 9/2019 | Lim |
| 2019/0297577 | A1 | 9/2019 | Lin |
| 2019/0364492 | A1 | 11/2019 | Azizi |
| 2020/0037247 | A1 | 1/2020 | Liao |
| 2020/0037396 | A1 | 1/2020 | Islam |
| 2020/0077338 | A1 | 3/2020 | Sui |
| 2020/0100179 | A1 | 3/2020 | Zhou |
| 2020/0107266 | A1 | 4/2020 | Liao |
| 2020/0154355 | A1 * | 5/2020 | Nam ................. H04W 52/0216 |
| 2020/0178172 | A1 * | 6/2020 | Thangarasa ........... H04W 76/28 |
| 2020/0229092 | A1 | 7/2020 | Wu |
| 2020/0229093 | A1 | 7/2020 | Ahmad |
| 2020/0229098 | A1 | 7/2020 | Cheng |
| 2020/0245303 | A1 | 8/2020 | Hwang |
| 2020/0260304 | A1 | 8/2020 | Zhou |
| 2020/0267670 | A1 | 8/2020 | Strom |
| 2020/0267678 | A1 | 8/2020 | Kim |
| 2021/0058865 | A1 | 2/2021 | Xu |
| 2021/0105721 | A1 | 4/2021 | Xu |
| 2021/0259044 | A1 | 8/2021 | Islam |
| 2021/0321333 | A1 | 10/2021 | Miao |
| 2021/0321446 | A1 | 10/2021 | Lee |
| 2021/0345248 | A1 | 11/2021 | Xue |
| 2022/0060992 | A1 | 2/2022 | Xue |
| 2022/0110054 | A1 * | 4/2022 | Seo ................... H04W 52/0212 |
| 2022/0140943 | A1 | 5/2022 | Zhang |
| 2022/0150834 | A1 | 5/2022 | Li |
| 2022/0182942 | A1 | 6/2022 | Guo |
| 2022/0303902 | A1 * | 9/2022 | Tao ................... H04W 72/0446 |

FOREIGN PATENT DOCUMENTS

| | | |
|---|---|---|
| KR | 1020140121907 | 10/2014 |
| KR | 1020140145194 | 12/2014 |
| KR | 1020190010741 | 1/2019 |
| WO | 2019059674 | 3/2019 |
| WO | 2020037319 | 2/2020 |

OTHER PUBLICATIONS

Qualcomm Incorporated: "Potential Techniques for UE Power Saving", 3GPP Draft; R1-1903016 Potential Techniques for UE Power Saving, 3rd Generation Partnership Project (3GPP), Mobile Competence Centre; 650, Route Des Lucioles; F-06921 Sophia-Antipolis Cedex; France; vol. RAN WG1, No. Athens, Greece, Feb. 25, 2019-Mar. 1, 2019; Feb. 16, 2019 (Feb. 16, 2019).

CMCC: "Considerations on power saving signal design", 3GPP Draft; R1-1812890, 3rd Generation Partnership Project (3GPP), Mobile Competence Centre; 650, Route Des Lucioles; F-06921 Sophia-Antipolis Cedex; France; vol. RAN WG1, No. Spokane, USA; Nov. 12, 2018-Nov. 16, 2018; Nov. 11, 2018.

OPPO: "UE Adaptation to the Traffic and UE Power Consumption", 3GPP Draft; R1-1902745, 3rd Generation Partnership Project (3GPP), Mobile Competence Centre; 650, Route Des Lucioles; F-06921 Sophia-Antipolis Cedex; France; vol. RAN WG1, No. Athens, Greece; Feb. 25, 2019-Mar. 1, 2019; Feb. 16, 2019.

"3rd Generation Partnership Project; Technical Specification Group Radio Access Network; NR; Study on UE Power Saving (Release 16)", 3GPP Standard; Technical Report; 3GPP TR 38.840, 3rd Generation Partnership Project (3GPP), Mobile Competence Centre; 650, Route Des Lucioles; F-06921 Sophia-Antipolis Cedex; France, No. V1.0.0, Mar. 14, 2019 pp. 1-70.

First Examination Report for IN Patent Application No. 202014014510; 5 pages; Sep. 2, 2022.

Office Action for Chinese Application for Invention No. 202010250456.9; Dec. 30, 2022.

* cited by examiner

| Joint PS Signal Value | P-cell Indication | S-cell(s) Indication |
|---|---|---|
| '000' | No PDCCH monitoring skipping | Resume PDCCH monitoring if stopped/activate if deactivated |
| '001' | 5 ms of PDCCH monitoring skipping | 5 ms of PDCCH monitoring skipping |
| '010' | 10 ms of PDCCH monitoring skipping | 20 ms of PDCCH monitoring skipping |
| '011' | 20 ms of PDCCH monitoring skipping | 40 ms of PDCCH monitoring skipping |
| '100' | 30 ms of PDCCH monitoring skipping | Suspend S-cell(s) |
| ... | ... | ... |
| '111' | 40 ms of PDCCH monitoring skipping | Deactivate S-cell(s) |

*FIG. 14*

| Joint PS Signal Value | P-cell Indication | S-cell(s) Indication |
|---|---|---|
| '000' | Default BWP | deactivation |
| '001' | Default BWP | suspend |
| '010' | BWP1 | suspend |
| '011' | BWP2 | suspend |
| '100' | BWP2 | Default BWP |
| '101' | BWP2 | BWP2 |
| ... | ... | ... |

FIG. 15

CONFIGURABLE POWER SAVING SIGNAL WITH MULTIPLE FUNCTIONALITIES IN 5G NR

PRIORITY DATA

This application is a continuation of U.S. patent application Ser. No. 16/835,579, filed Mar. 31, 2020, which claims benefit of priority to U.S. Provisional Application Ser. No. 62/827,810, filed Apr. 1, 2019, and U.S. Provisional Application Ser. No. 62/828,735, filed Apr. 3, 2019, each of which is hereby incorporated by reference in its entirety as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

FIELD

The present application relates to wireless devices, and more particularly to apparatus, systems, and methods for a wireless device to perform a variety of cellular communication techniques.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods to configure a power savings signal in fifth generation (5G) new radio (NR) networks.

The techniques described herein may be implemented in and/or used with a number of different types of devices, including but not limited to cellular phones, tablet computers, wearable computing devices, portable media players, and any of various other computing devices.

In some embodiments, a wireless device may perform a method for power savings via a power saving signal received from a base station. The method may include the wireless device transmitting, to the base station within a network, power savings requirements and receiving, from the base station, a configuration of a power saving signal, wherein the configuration indicates one or more functionalities of the power saving signal. The method may also include the wireless device periodically receiving, from the base station, the power saving signal and interpreting the power saving signal based on the configuration. In some embodiments, the configuration of the power saving signal may be received via radio resource control signaling. In some embodiments, the configuration may be pre-defined (or pre-configured, e.g., via standardization) or the configuration may be negotiated between the wireless device and the base station. The negotiation may include the wireless device requesting a minimum gap between receipt of the power saving signal and an action indicated by the functionality of the power saving signal. In some embodiments, a parameter included in the power saving signal may indicate a gap between receipt of the power saving signal and an action indicated by the functionality of the power saving signal that is greater than or equal to the minimum gap.

In some embodiments, the one or more functionalities include at least one of a power saving signal functioning as a wake-up signal, a power saving signal functioning as a physical downlink control channel (PDCCH) monitoring skipping signal, a power saving signal functioning as a PDCCH monitoring periodicity change signal, a power saving signal functioning as a bandwidth part (BWP) switching indicator, a power saving signal functioning as a maximum number of multiple input multiple output (MIMO) layer indicator; a power saving signal functioning as a minimum K0 indicator, where K0 indicates a number of slots between a slot scheduled for the PDCCH and a slot scheduled for a physical downlink shared channel (PDSCH), and/or a power saving signal functioning as a secondary cell control indicator.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 14 illustrates examples of possible values of a PS signal and associated indications for p-cell and s-cell control, according to some embodiments.

FIG. 15 illustrates examples of possible values of a PS signal and associated indications for p-cell and s-cell control, according to some embodiments.

Figure 1A:
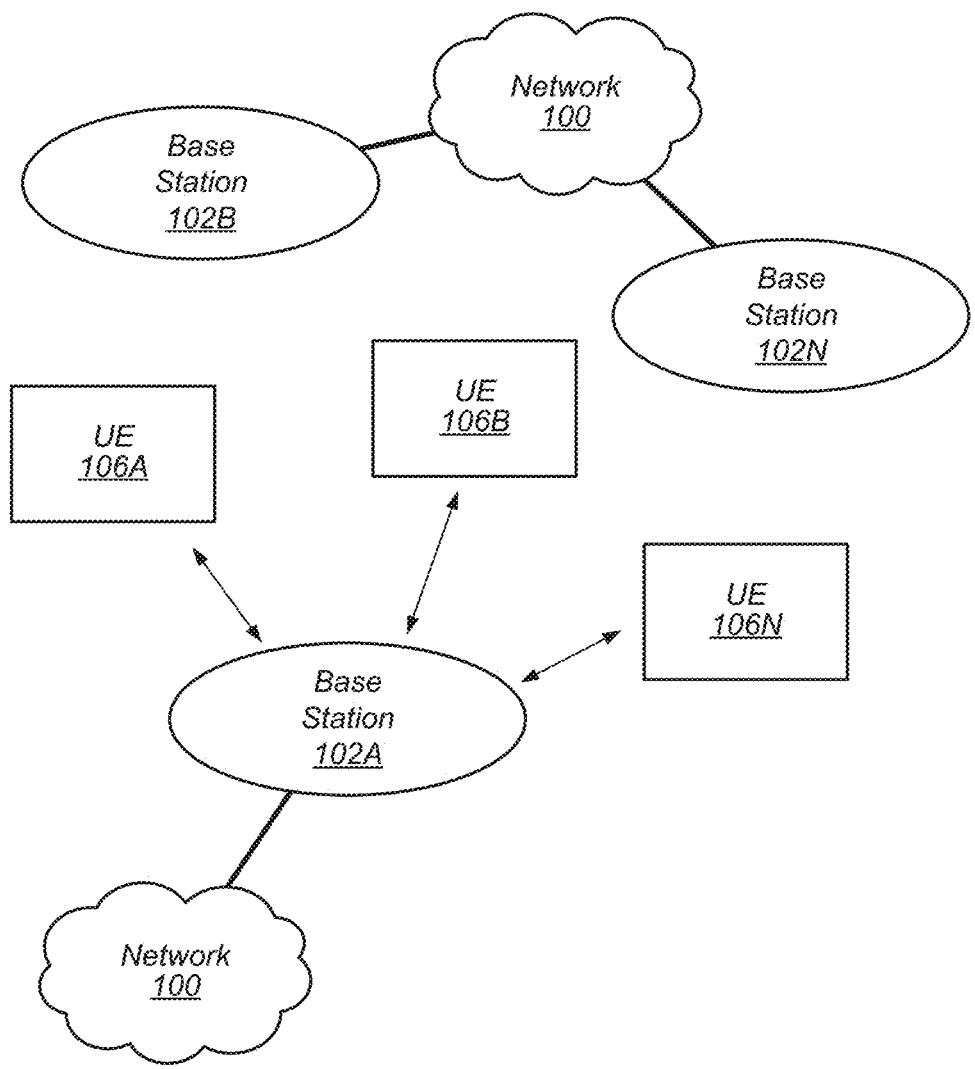
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
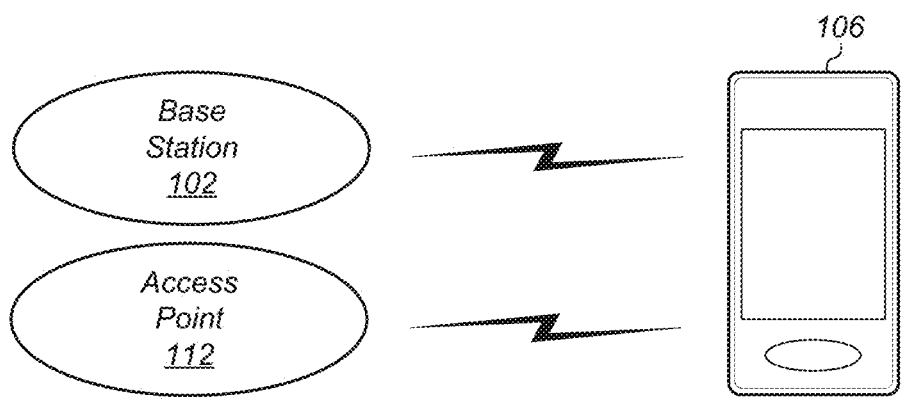
FIG. 1B illustrates an example of a base station (BS) and an access point in communication with a user equipment (UE) device according to some embodiments.

FIGS. 1A and 1B—Communication Systems

FIG. 1A illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, NEV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTTor LTE or GSM), and separate radios for communicating using each of Wi-Fi and Bluetooth. Other configurations are also possible.

Figure 2:
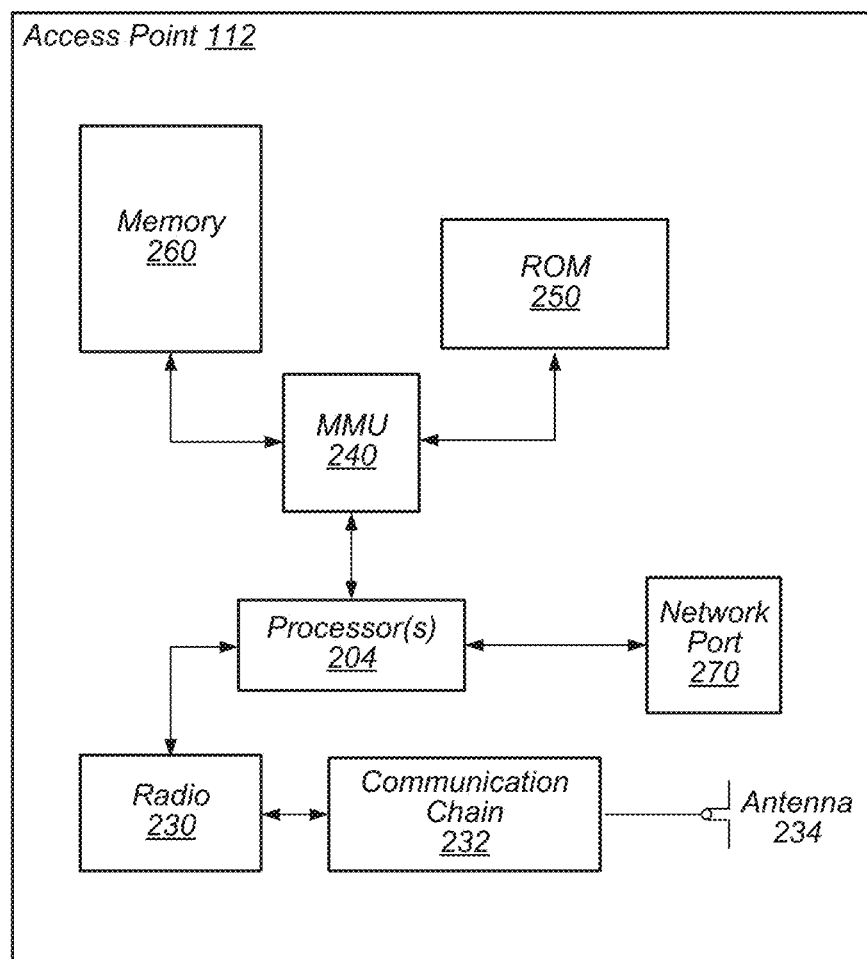
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to implement methods for configuring a power savings signal in fifth generation (5G) new radio (NR) networks, e.g., as further described herein.

Figure 3:
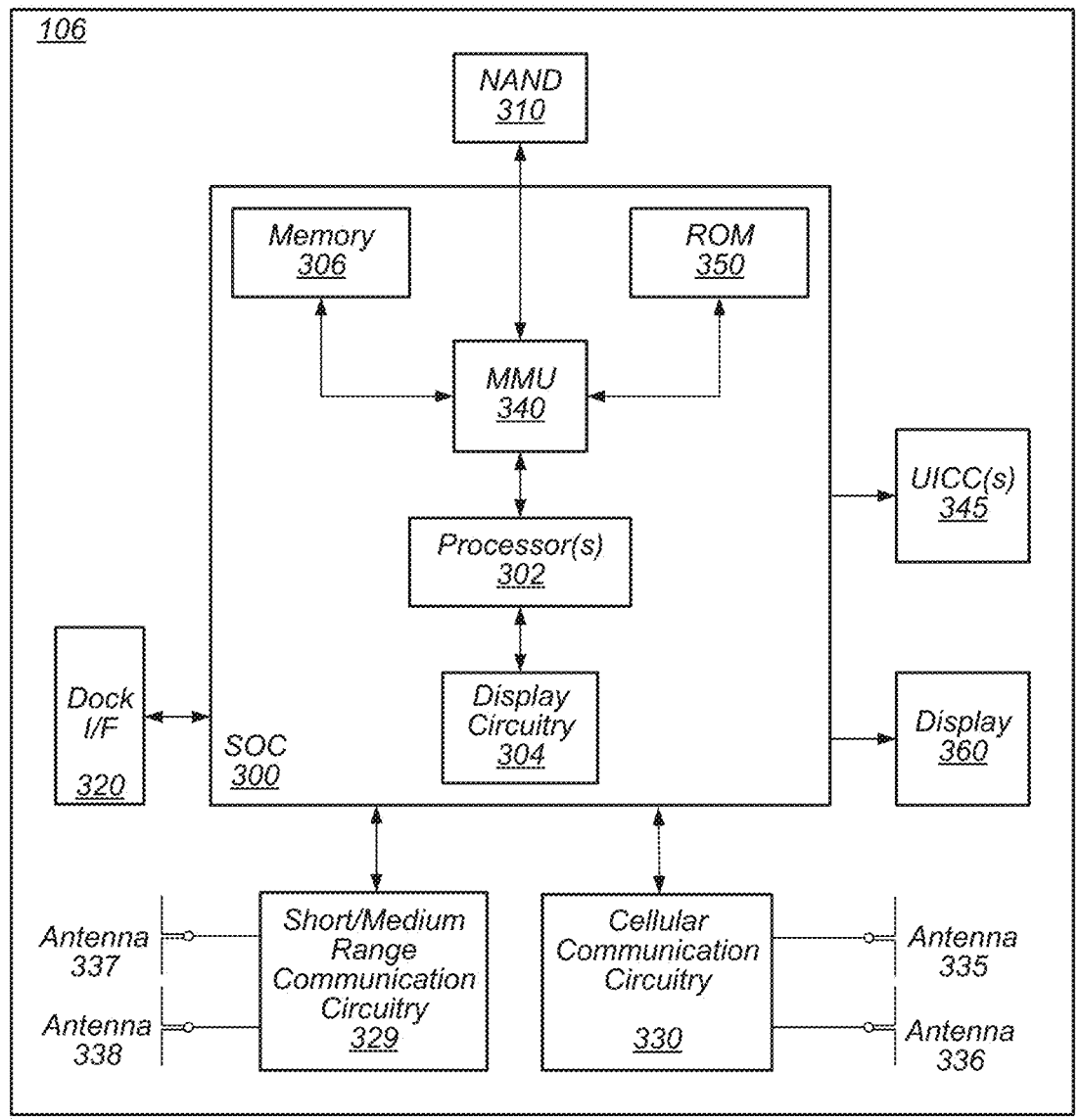
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for configuring a power savings signal in fifth generation (5G) new radio (NR) networks, e.g., as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short-range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short-range wireless communication circuitry 329 may include one or more ICs that are configured to perform the functions of short-range wireless communication circuitry 32. In addition, each integrated circuit may include circuitry (e.g., first circuitry, second circuitry, etc.) configured to perform the functions of short-range wireless communication circuitry 329.

Figure 4:
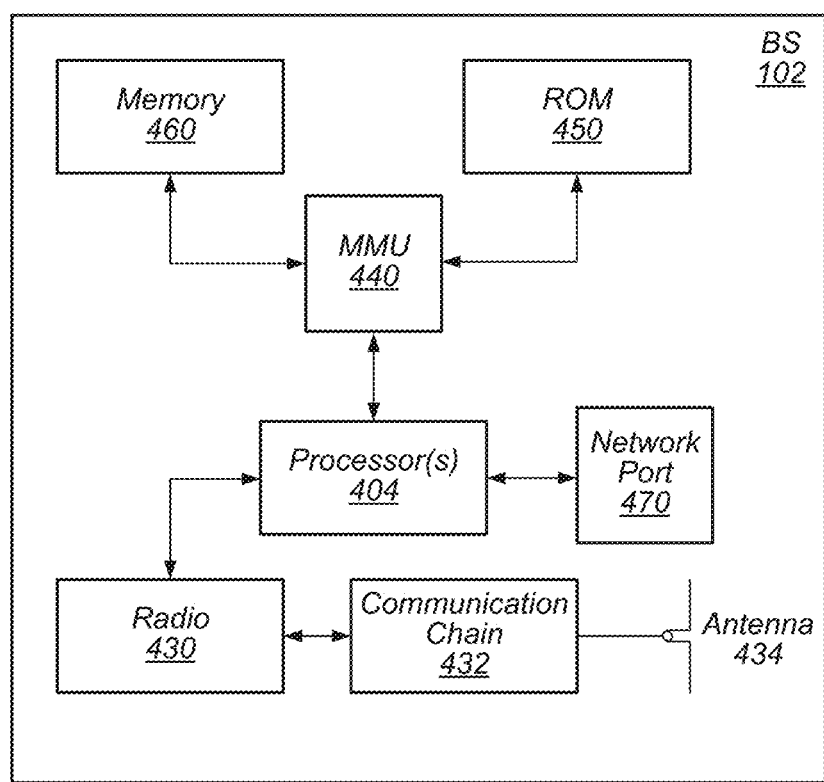
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein, e.g., for configuring a power savings signal in fifth generation (5G) new radio (NR) networks. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
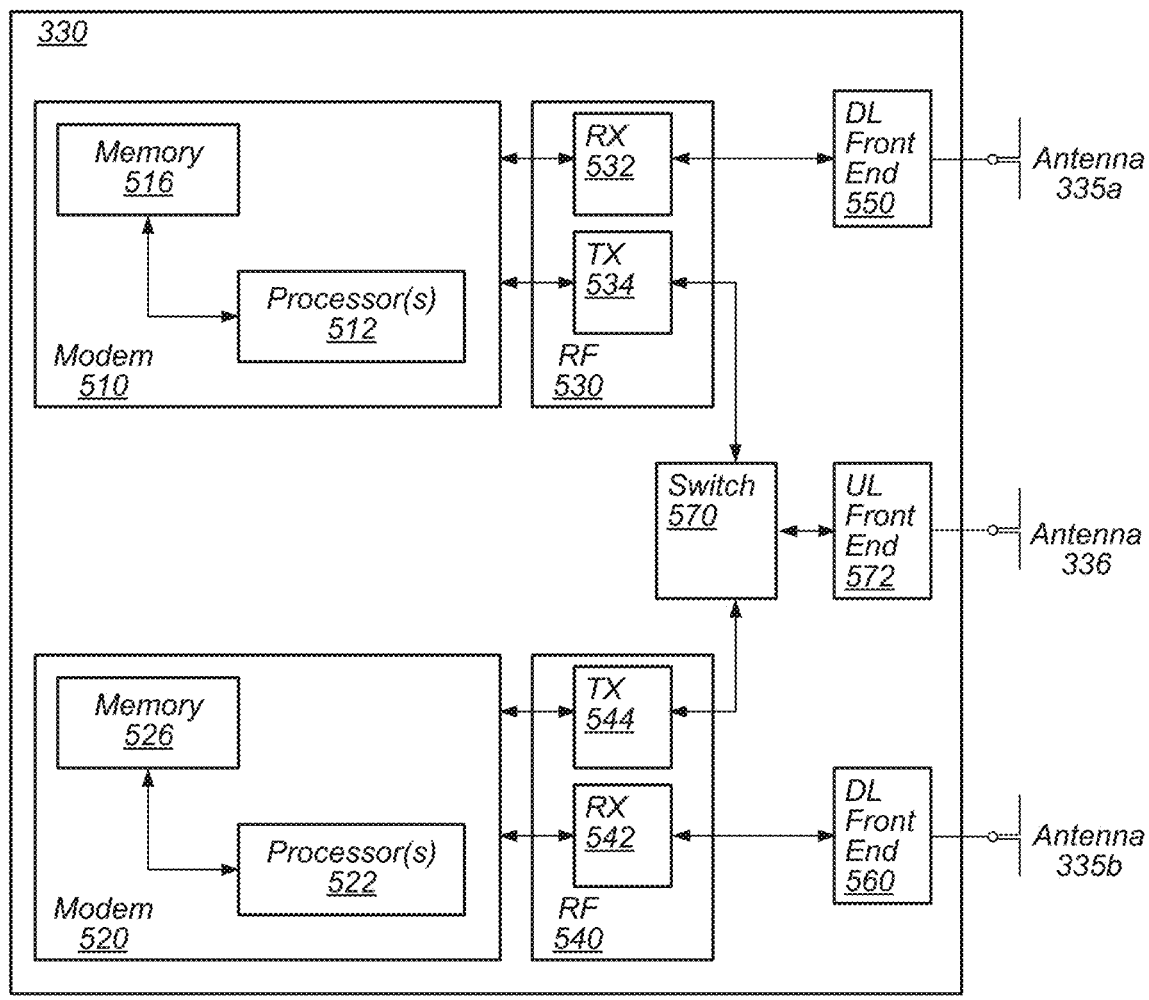
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods for defining and using a resource map for semi-persistent resource reservations/scheduling for unicast and/or groupcast communications in V2X (vehicle to everything) networks, e.g., as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
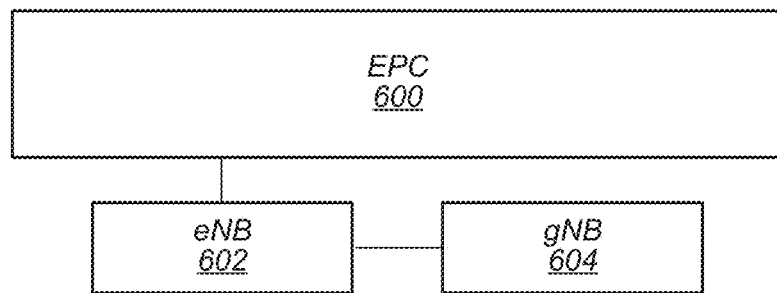
FIG. 6A illustrates an example of connections between an EPC network, an LTE base station (eNB), and a 5G NR base station (gNB).
Figure 6B:
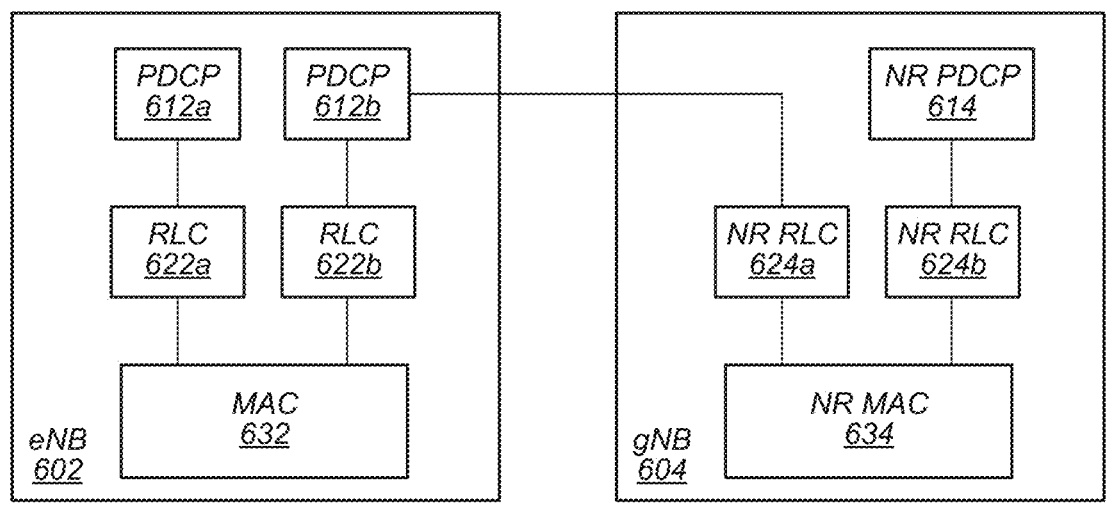
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622*a-b*. RLC layer 622*a* may also interface with packet data convergence protocol (PDCP) layer 612*a* and RLC layer 622*b* may interface with PDCP layer 612*b*. Similar to dual connectivity as specified in LTE-Advanced Release 12, PDCP layer 612*a* may interface via a master cell group (MCG) bearer to EPC network 600 whereas PDCP layer 612*b* may interface via a split bearer with EPC network 600.

Additionally, as shown, gNB 604 may include a MAC layer 634 that interfaces with RLC layers 624*a-b*. RLC layer 624*a* may interface with PDCP layer 612*b* of eNB 602 via an X2 interface for information exchange and/or coordination (e.g., scheduling of a UE) between eNB 602 and gNB 604. In addition, RLC layer 624*b* may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking with Wi-Fi

Figure 7A:
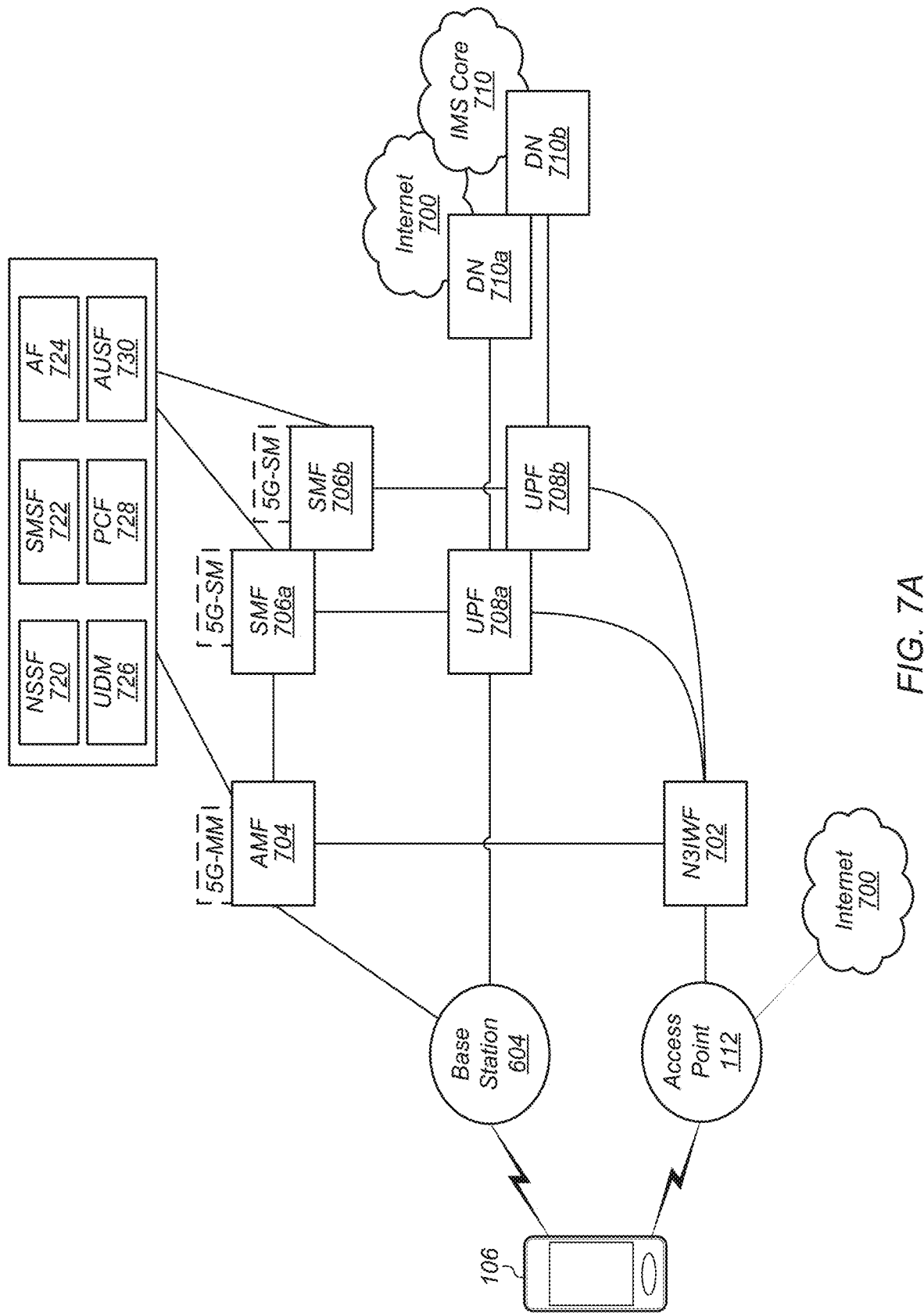
FIG. 7A illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706*a* and an SMF 706*b* of the 5G CN. The AMF 706 may be connected to (or in communication with) the SMF 706*a*. Further, the gNB 604 may in communication with (or connected to) a user plane function (UPF) 708*a* that may also be communication with the SMF 706*a*. Similarly, the N3IWF 702 may be communicating with a UPF 708*b* that may also be communicating with the SMF 706*b*. Both UPFs may be communicating with the data network (e.g., DN 710*a* and 710*b*) and/or the Internet 700 and IMS core network 710.

Figure 7B:
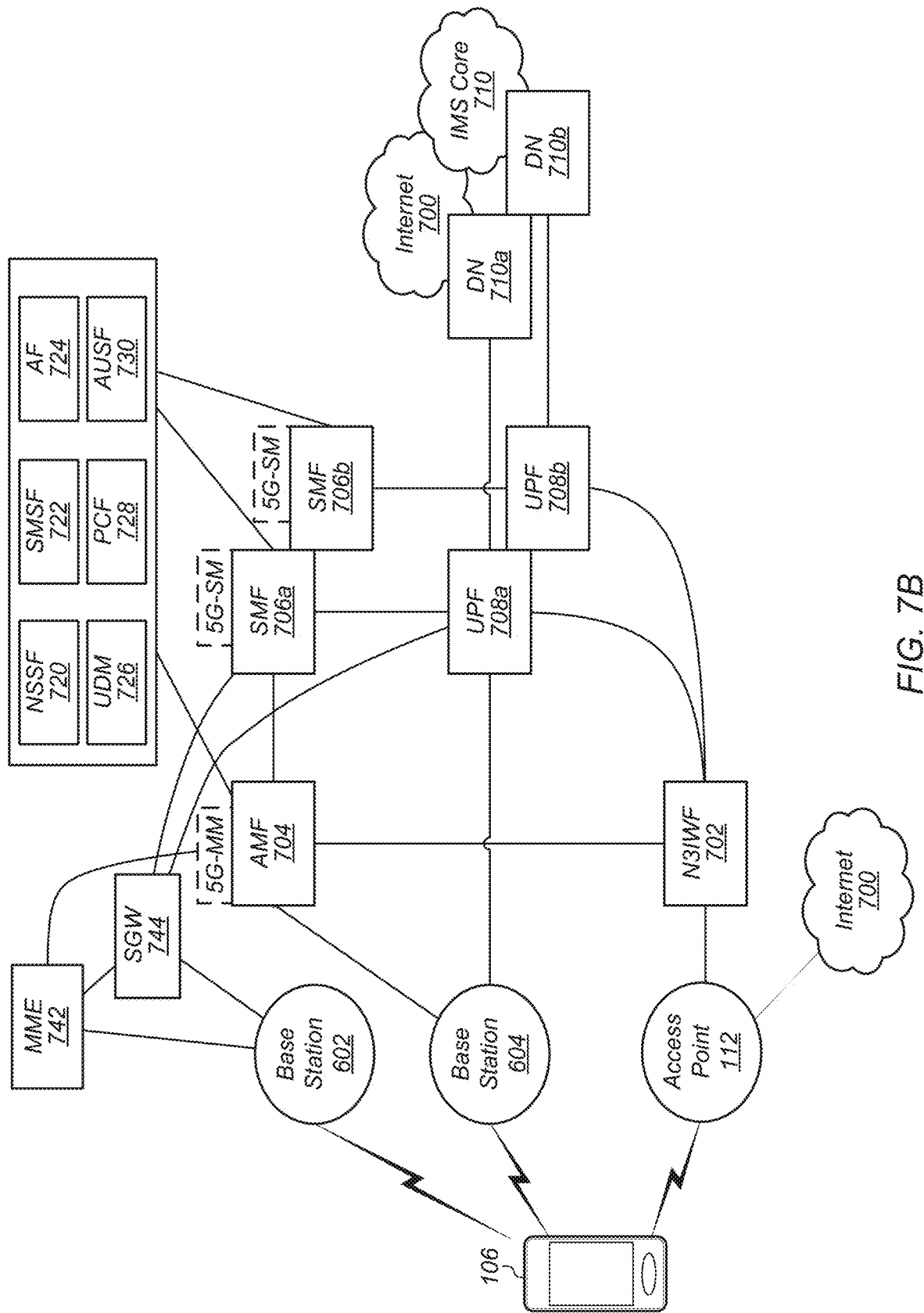
FIG. 7B illustrates an example of a 5G network architecture that incorporates both dual 3GPP (e.g., LTE and 5G NR) access and non-3GPP access to the 5G CN, according to some embodiments.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706*a* and the UPF 708*a*. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF706*a* and the SMF 706*b* of the 5G CN. The AMF 706 may be connected to (or in communication with) the SMF 706*a*. Further, the gNB 604 may in communication with (or connected to) the UPF 708*a* that may also be communication with the SMF 706*a*. Similarly, the N3IWF 702 may be communicating with a UPF 708*b* that may also be communicating with the SMF 706*b*. Both UPFs may be communicating with the data network (e.g., DN 710*a* and 710*b*) and/or the Internet 700 and IMS core network 710.

Note that in various embodiments, one or more of the above described network entities may be configured to perform methods to configure a power savings signal in fifth generation (5G) new radio (NR) networks, e.g., as further described herein.

Figure 8:
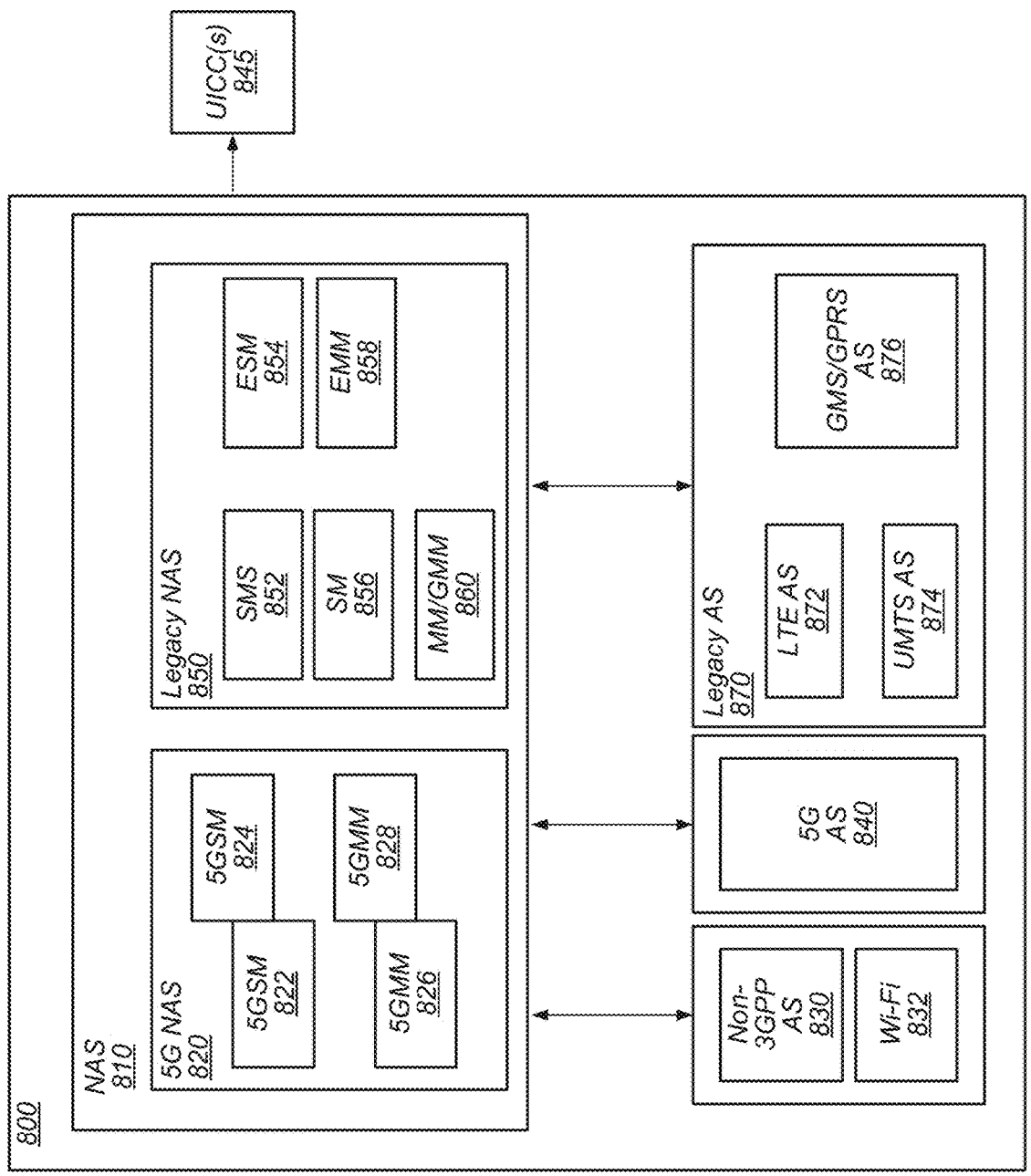
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described elements may be configured to perform methods to implement mechanisms for configuring a power savings signal in fifth generation (5G) new radio (NR) networks, e.g., as further described herein.

Power Saving Indications

In some existing implementations, a mobile station, or UE, may have a limited amount of power, e.g., based on a size of an included battery. Thus, due to the size of the included battery, power consumption of the UE may be directly translated (or related) to talk time, stand by time, and/or usage time. In addition, as compared to legacy protocols (or RATs) such as LTE, Fifth Generation (5G) New Radio (NR), which supports much wider bandwidth than LTE, is expected to consume more power. Further, since initial deployment of 5G NR will be based on a dual connectivity solution with LTE, power consumption will be further increased due to requiring both LTE and 5G NR radios to be on. Thus, power consumption reduction is needed.

For example, it has been acknowledged that UE power consumption in initial deployments of 5G NR (e.g., dual connectivity 5G NR-LTE) is unnecessarily high due to a variety of factors. As one example, physical downlink control channel (PDCCH) monitoring without a grant has been shown to unnecessarily increase power consumption in certain instances, such as PDCCH monitoring without a grant between packet arrival times and PDCCH monitoring without a grant during a connected mode discontinuous reception cycle (CDRX) "on" duration. Additionally, unnecessary power consumption has been shown when using too wide bandwidth for data arrival (e.g., the bandwidth used for data arrival is too wide as compared to an amount of data arriving). As another example, S-cells may be turned on for a longer time than necessary to fully utilize. In other words, S-cells may be under-utilized based on the duration that they are on. As a further example, usage of more multiple input multiple output (MIMO) layers than necessary leads to unnecessary power consumption since addition receive chains need to be powered to support the MIMO layers.

Embodiments described herein provide a configurable power saving signal (or channel) with multiple functionalities. In some embodiments, the functionalities of the configurable power saving signal may include any, any combination of, and/or all of a wake-up signal, a PDCCH monitoring skipping signal, a PDCCH monitoring periodicity change signal, a signal to trigger bandwidth switching, a signal to trigger maximum MIMO layer indication, a signal to trigger minimum K0 indicator, and/or a signal to trigger S-cell control. In some embodiments, the functionality of the configurable power saving signal may be determined by radio resource control (RRC) signaling depending on UE capability and needs.

For example, in some embodiments, a UE, such as UE 106, may be configured to monitor a power saving (PS) signal (or channel) which may be configured as a wake-up signal (or channel). In some embodiments, the UE may be configured to monitor a power saving signal prior to an "on" period (or wakeup period) of a discontinuous reception cycle (DRX). Additionally, in some embodiments, a gap (e.g., a period of time) between a power saving signal monitoring occasion and a DRX "on" start time may be pre-configured (e.g., via signaling between a base station, such as gNB 604 and the UE). In some embodiments, the pre-configuration may involve a negotiation between the UE and a base station, such as gNB 604. In some embodiments, the UE may request a minimum gap value and the base station may accommodate the UE with a gap time greater than or equal to the minimum gap value. In some embodiments, the base station may configure the gap time without input from the UE, e.g., based on a pre-configured and/or standardized value for the gap time.

Figure 9:
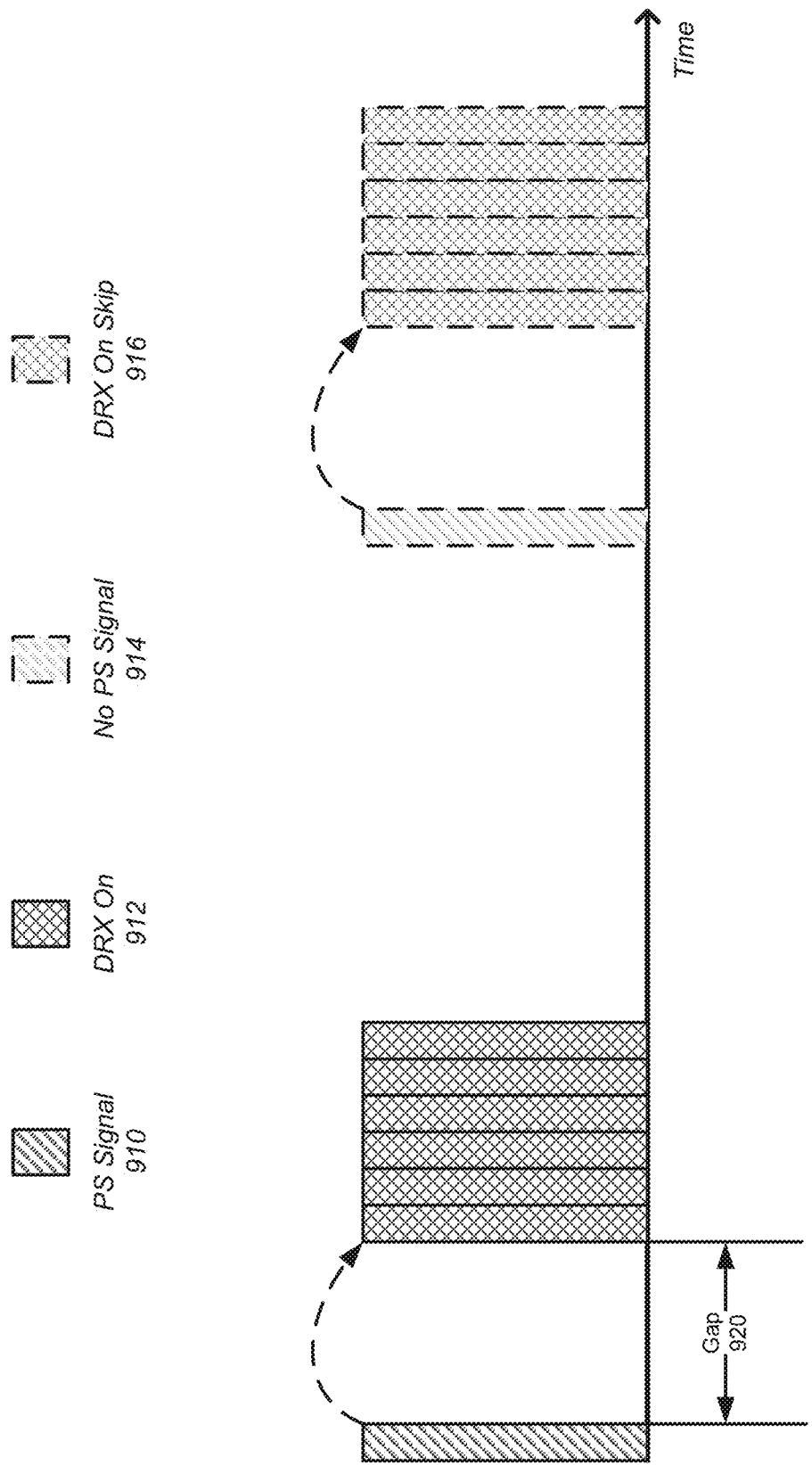
FIG. 9 illustrates an example monitoring a power saving signal, according to some embodiments.

In some embodiments, as illustrated by FIG. 9, a UE, such as UE 106, may monitor a power saving signal (or channel), such as PS signal 910, from a base station, such as gNB 604. As discussed above, the base station may specify a gap 920 between detection of PS signal 910 and a start of a corresponding DRX on cycle, such as DRX on 912. Further, as shown, if the UE does not detect PS signal 910 (e.g., shown as no PS signal 914), the UE may skip a correspond DRX on cycle (e.g., shown as DRX on skip 916). Thus, based upon detection (or lack of detection) of PS signal 910, the UE may realize power savings.

In some embodiments, a PS signal may be further configured to include a parameter indicating the gap between a power saving signal monitoring occasion and a DRX "on" start time (e.g., as described above) and a parameter indicating a number of DRX "on" cycles to attend (in case of PS signal detection) or skip (in case of no PS signal detection). In such embodiments, a periodicity of the PS signal may be longer than a DRX cycle.

Figure 10A:
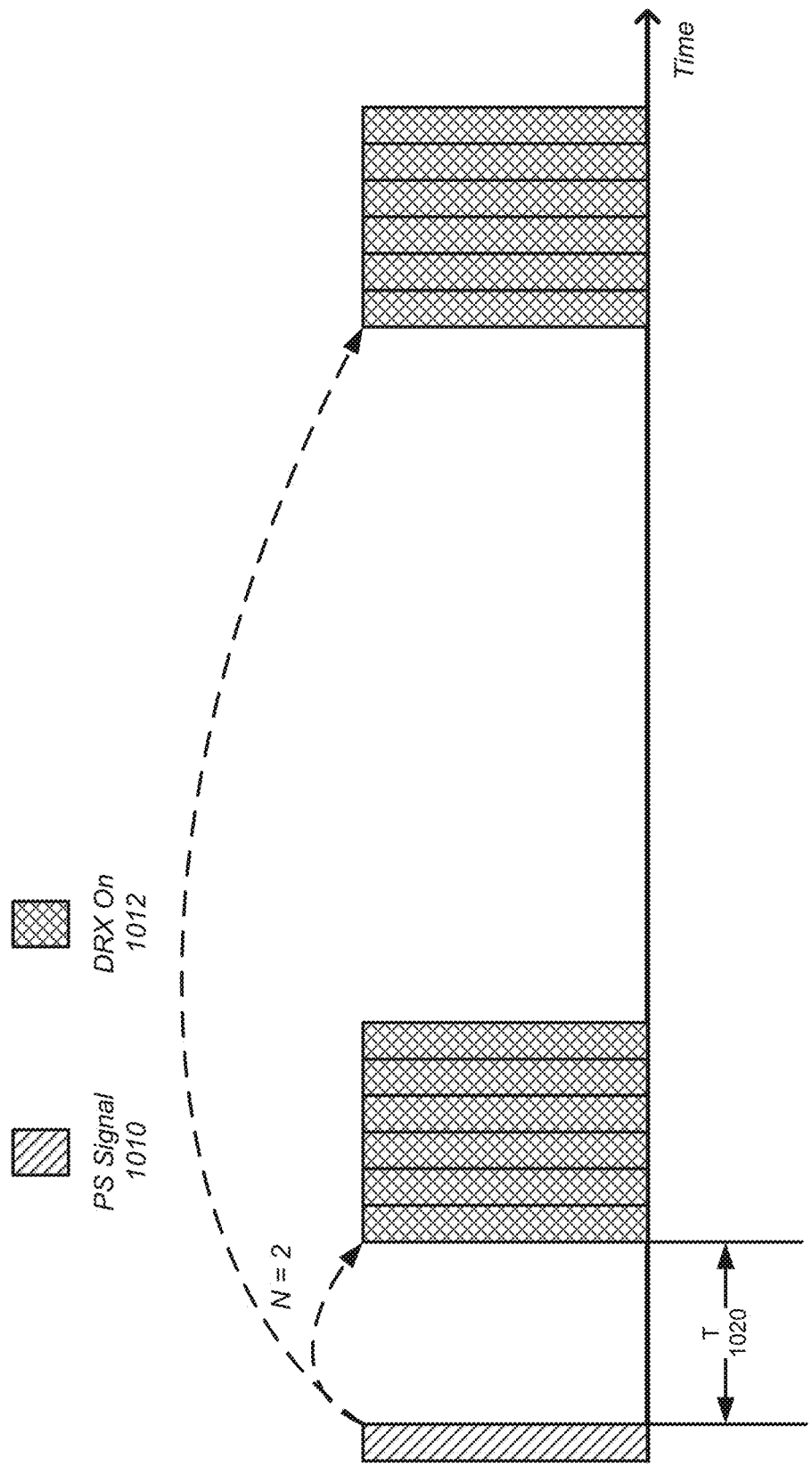
FIGS. 10A-10D illustrate examples of monitoring a power saving signal configured as a wake-up signal, according to some embodiments.
Figure 10B:
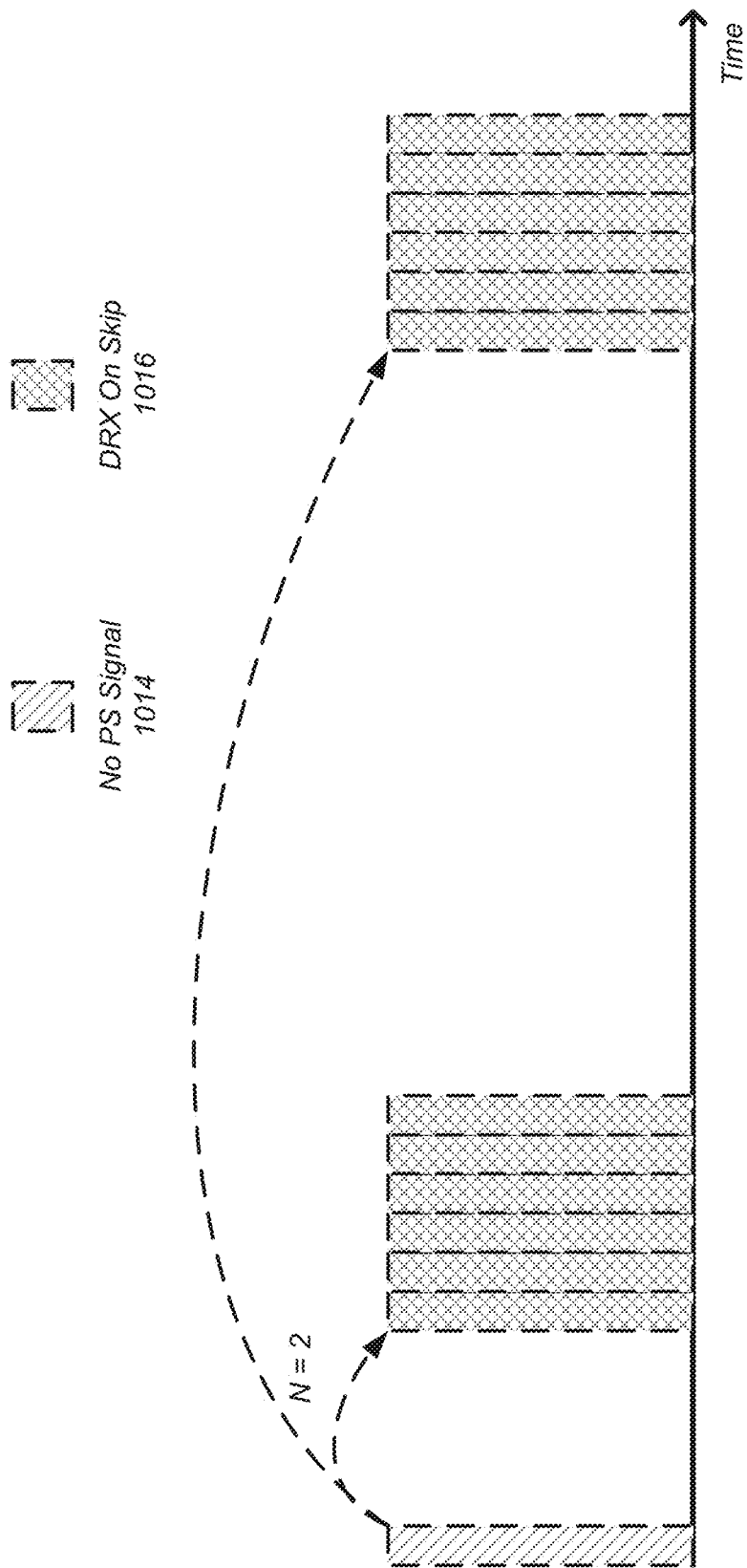

In some embodiments, as illustrated by FIG. 10A, a UE, such as UE 106, may periodically monitor a power saving signal (or channel), such as PS signal 1010, from a base station, such as gNB 604. As discussed above, the base station may specify a gap (e.g., T 1020) between detection of PS signal 1010 and a start of a corresponding DRX on cycle, such as DRX on cycle 1012. Additionally, the PS signal 1010 may include a parameter (e.g., N) indicating a number of DRX on cycles 1012 the UE is to perform. Further, as shown in FIG. 10B, if the UE does not detect PS signal 1010 (e.g., shown as no PS signal 1014), the UE may skip a corresponding number DRX on cycles (e.g., shown as DRX on skip 1016). Note that the number of DRX on cycles may be pre-configured (e.g., via RRC signaling) in at least some embodiments. Thus, based upon detection (or lack of detection) of PS signal 1010, the UE may realize power savings.

Figure 10C:
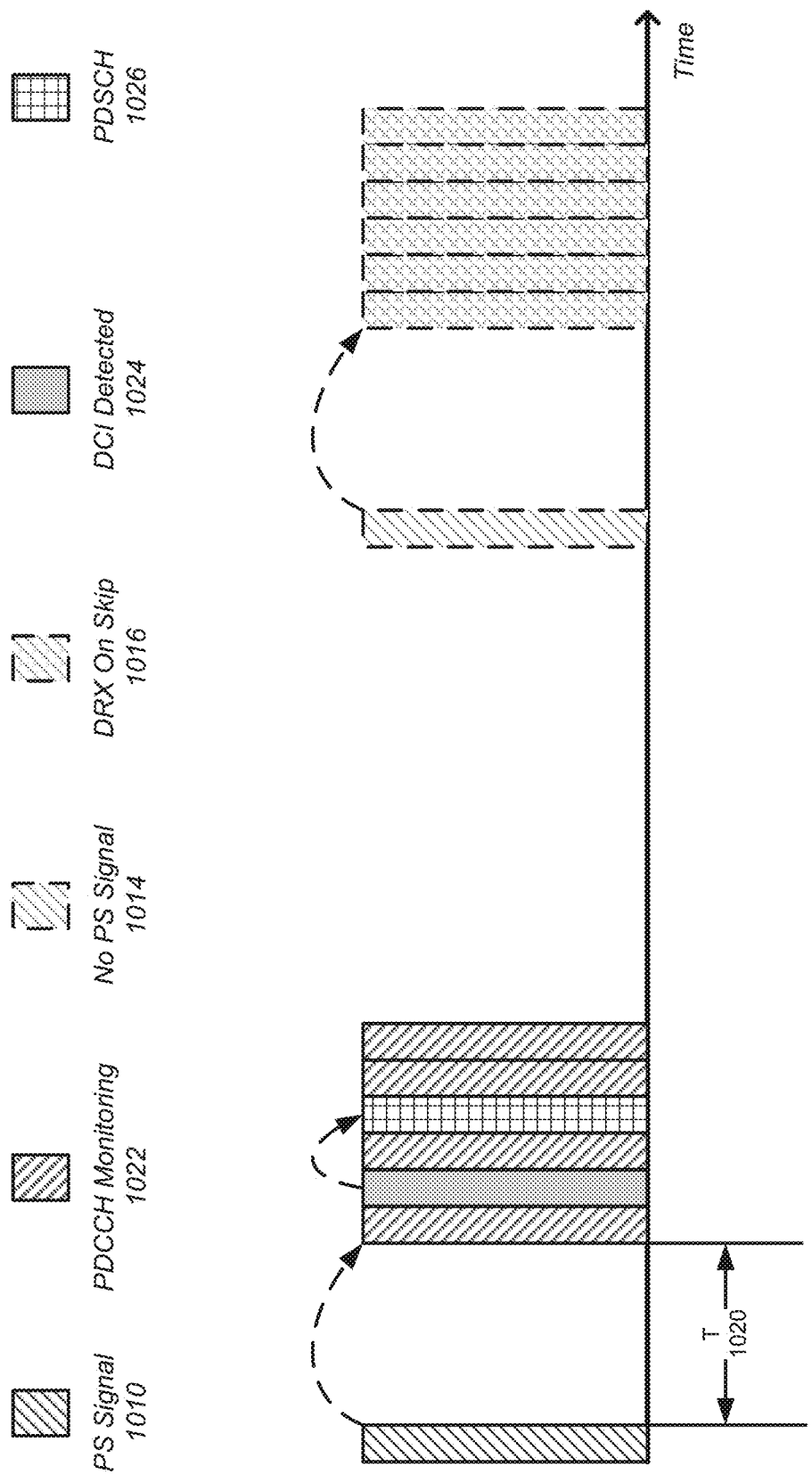
Figure 10D:
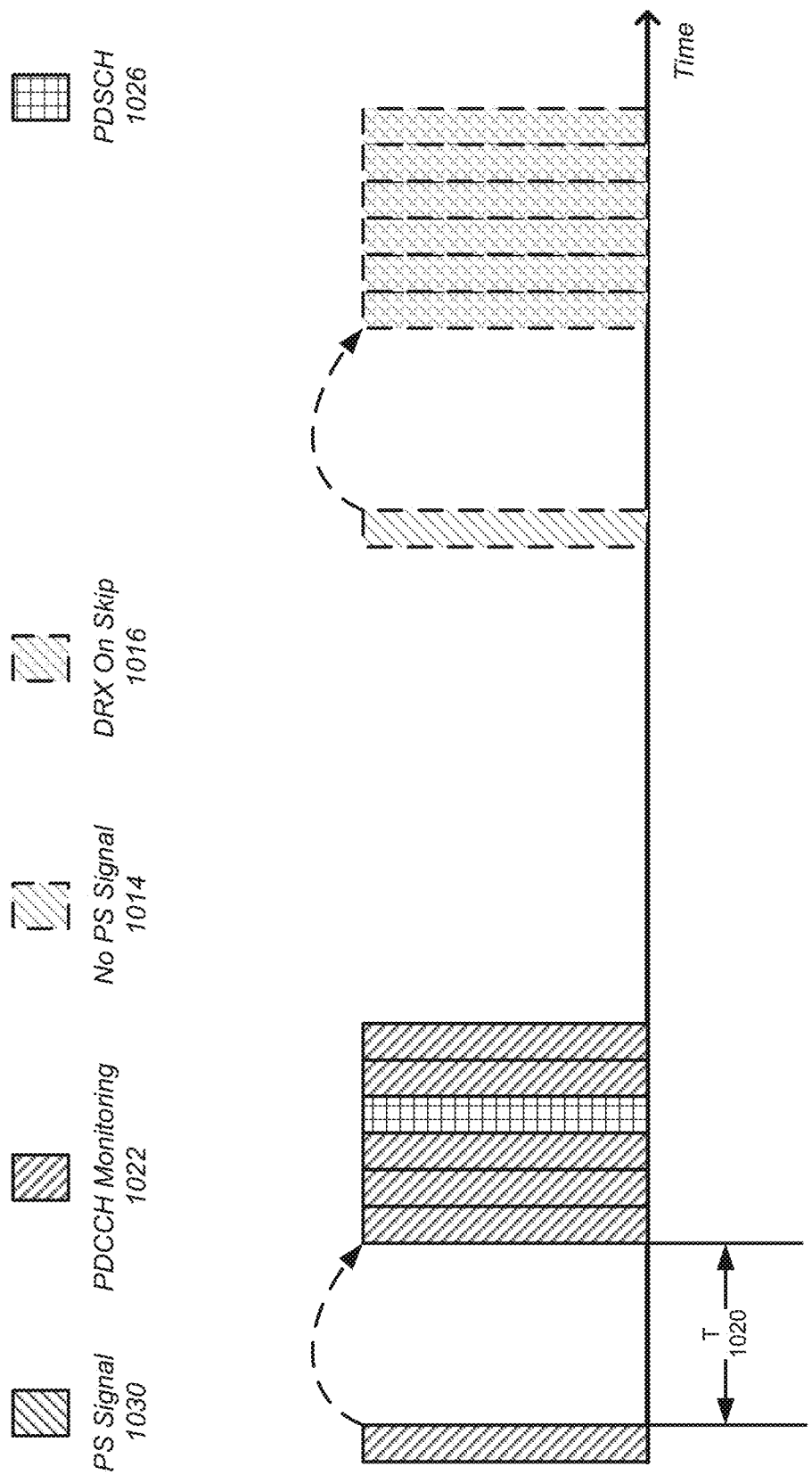

In some embodiments, as illustrated by FIG. 10C, a UE may, during a DRX on cycle, perform PDCCH monitoring 1022 upon detection of a PS signal 1030. During PDCCH monitoring 1022, the UE may detect a downlink control index (DCI) 1024 indicating a scheduled PDSCH 1026. Thus, in some embodiments, a data scheduling DCI may be used as a PS signal. For example, as illustrated by FIG. 10D, a base station, such as gNB 604, may send a DCI for data scheduling instead of a PS signal. Thus, PS signal 1030 may be the data scheduling DCI and may include resource allocation information for corresponding PDSCH 1026. Thus, upon receipt of the PS signal (or data scheduling DCI) 1030, the UE may wakeup and may schedule both PDCCH monitoring 1022 and the PDSCH 1026 without receiving further scheduling information from the base station. In some embodiments, the UE may interpret (or understand) that the data scheduling DCI received during wake up signal monitoring occasion may include only K0 values larger than (greater than or equal to) the gap (e.g., T 1030) among all K0 values in a time domain resource allocation TDRA (table).

As another example, in some embodiments, a UE, such as UE 106, may be configured to monitor a power saving (PS) signal (or channel) which may be configured as a PDCCH monitoring skipping signal. In some embodiments, if a UE detects such a power saving signal (or channel), the UE may skip scheduled monitoring of the PDCCH for a specified length of time. Additionally, in some embodiments, a gap (e.g., a period of time) between a power saving signal monitoring occasion and PDCCH monitoring skipping may be pre-configured (e.g., via signaling between a base station, such as gNB 604 and the UE). In some embodiments, the pre-configuration may involve a negotiation between the UE and a base station, such as gNB 604. In some embodiments, the UE may request a minimum gap value and the base station may accommodate the UE with a gap time greater than or equal to the minimum gap value. In some embodiments, the base station may configure the gap time without input from the UE, e.g., based on a pre-configured and/or standardized value for the gap time.

Figure 11A:
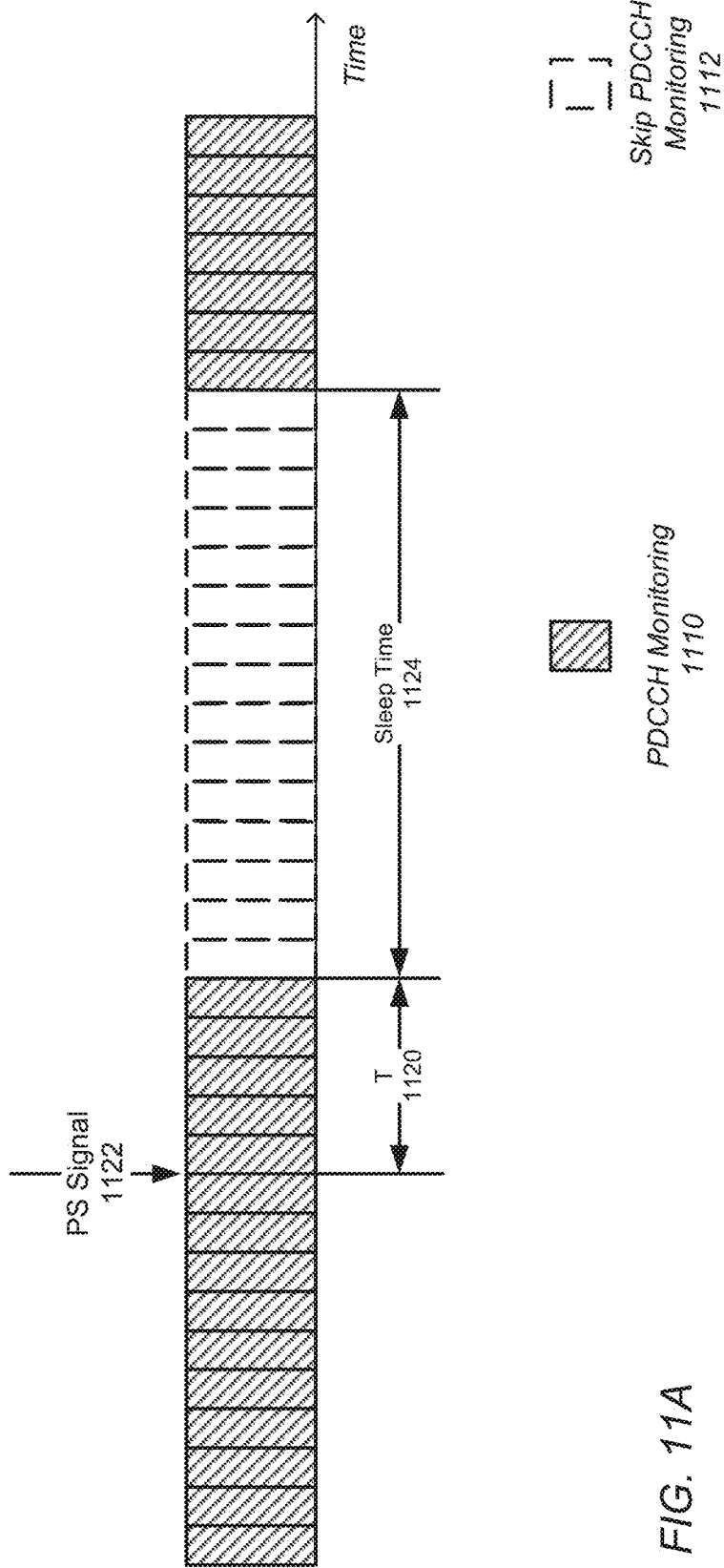
FIGS. 11A-11C illustrate examples of monitoring a power saving signal configured as a PDCCH monitoring skipping signal, according to some embodiments.

In some embodiments, as illustrated by FIG. 11A, a UE, such as UE 106, may monitor a power saving signal (or channel), such as PS signal 1122, from a base station, such as gNB 604. As discussed above, the base station may specify a gap 1120 (e.g., time period) between detection of PS signal 1122 and a start of a skipping period. Thus, as shown, upon detection of the PS signal 1122, a UE may continue PDCCH monitoring 1110 for a gap 1120 before entering a sleep cycle (as specified by sleep time 1124) during which the UE skips PDCCH monitoring (e.g., skip PDCCH monitoring 1112).

Figure 11B:
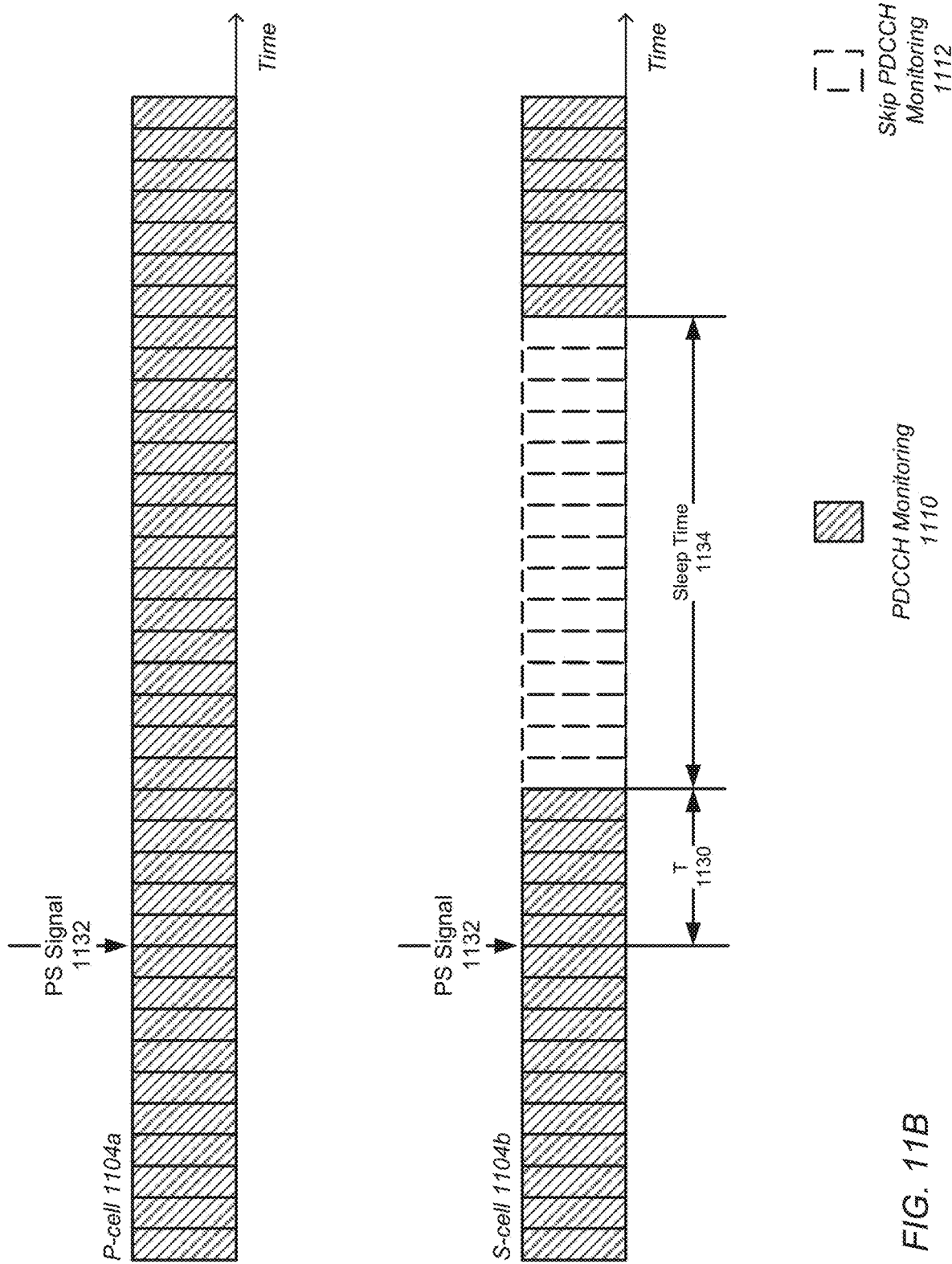
Figure 11C:
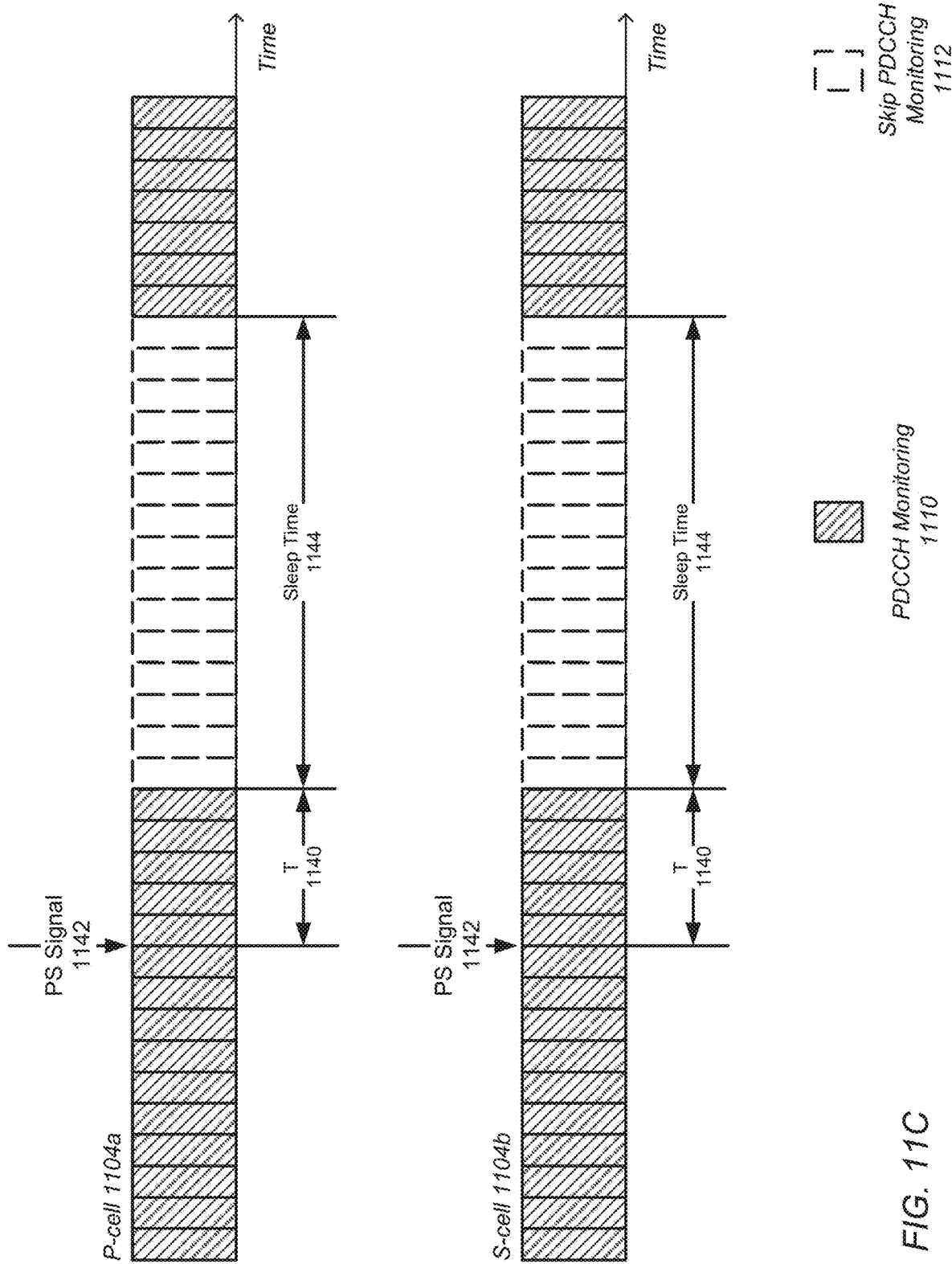

In some embodiments, a PS signal may be further configured to include a parameter indicating the gap between a power saving signal monitoring occasion and a PDCCH monitoring skipping period, a duration of a skipping period (e.g., a sleep duration) or an indication of a duration of a skipping period chosen from a plurality of durations of a skipping period, and an indication of a cell or set of cells (e.g., a primary (or master) cell and one or more secondary cells). For example, as illustrated by FIG. 11B, a UE, such as UE 106, may receive a PS signal 1132 from a base station, such as gNB 604. The PS signal 1132 may include a duration, T 1130, until start of a sleep period, a sleep time 1134, and an indication of whether the sleep period applies to p-cell 1104a and/or s-cell 1104b. As shown, the PS signal 1132 may indicate that the sleep period applies to s-cell 1104b and not to p-cell 1104a. Thus, the UE may continue PDCCH monitoring 1110 on p-cell 1104a while skipping PDCCH monitoring 1110 (e.g., skip PDCCH monitoring 1112) for the sleep time 1134 on s-cell 1104b. As another example, as illustrated by FIG. 11C, a UE, such as UE 106, may receive a PS signal 1142 from a base station, such as gNB 604. The PS signal 1142 may include a duration, T 1140, until start of a sleep period, a sleep time 1144, and an indication of whether the sleep period applies to p-cell 1104a and/or s-cell 1104b. As shown, the PS signal 1142 may indicate that the sleep period applies to s-cell 1104b and to p-cell 1104a. Thus, the UE may skip PDCCH monitoring 1110 (e.g., skip PDCCH monitoring 1112) on p-cell 1104a and s-cell 1104b for the sleep time 1144.

As another example, in some embodiments, a UE, such as UE 106, may be configured to monitor a power saving (PS) signal (or channel) which may be configured as a PDCCH monitoring periodicity change signal. In some embodiments, if a UE detects such a power saving signal (or channel), the UE may switch its PDCCH monitoring periodicity for a specified length of time. Additionally, in some embodiments, a gap (e.g., a period of time) between a power saving signal monitoring occasion and PDCCH monitoring periodicity change may be pre-configured (e.g., via signaling between a base station, such as gNB 604 and the UE). In some embodiments, the pre-configuration may involve a negotiation between the UE and a base station, such as gNB 604. In some embodiments, the UE may request a minimum gap value and the base station may accommodate the UE with a gap time greater than or equal to the minimum gap value. In some embodiments, the base station may configure the gap time without input from the UE, e.g., based on a pre-configured and/or standardized value for the gap time.

Figure 12A:
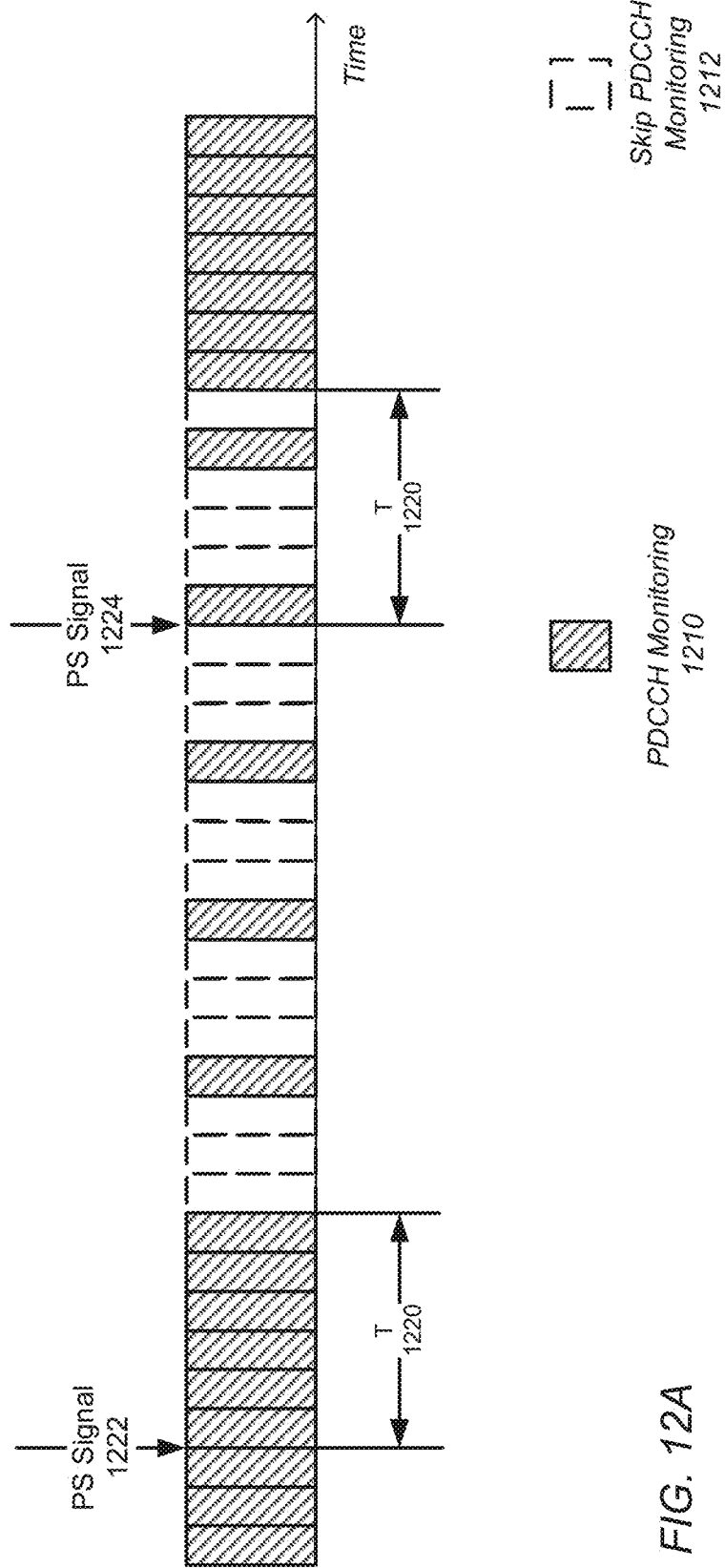
FIGS. 12A-12C illustrate examples of monitoring a power saving signal configured as a PDCCH monitoring periodicity change signal, according to some embodiments.

In some embodiments, as illustrated by FIG. 12A, a UE, such as UE 106, may monitor a power saving signal (or channel), such as PS signal 1222, from a base station, such as gNB 604. As discussed above, the base station may specify a time period 1220 between detection of PS signal 1222 and a start of a change in PDCCH monitoring periodicity. Thus, as shown, upon detection of the PS signal 1222, a UE may continue PDCCH monitoring 1210 for a time period 1220 (e.g., gap) before changing its PDCCH monitoring periodicity. Thus, the UE may skip monitoring of the PDCCH (e.g., skip PDCCH monitoring 1212) based on the indicated periodicity. As shown, upon receiving PS signal 1224, the UE may continue PDCCH monitoring based on PS signal 1222 for a time period 1220 before changing its PDCCH monitoring periodicity based on PS signal 1224.

Figure 12B:
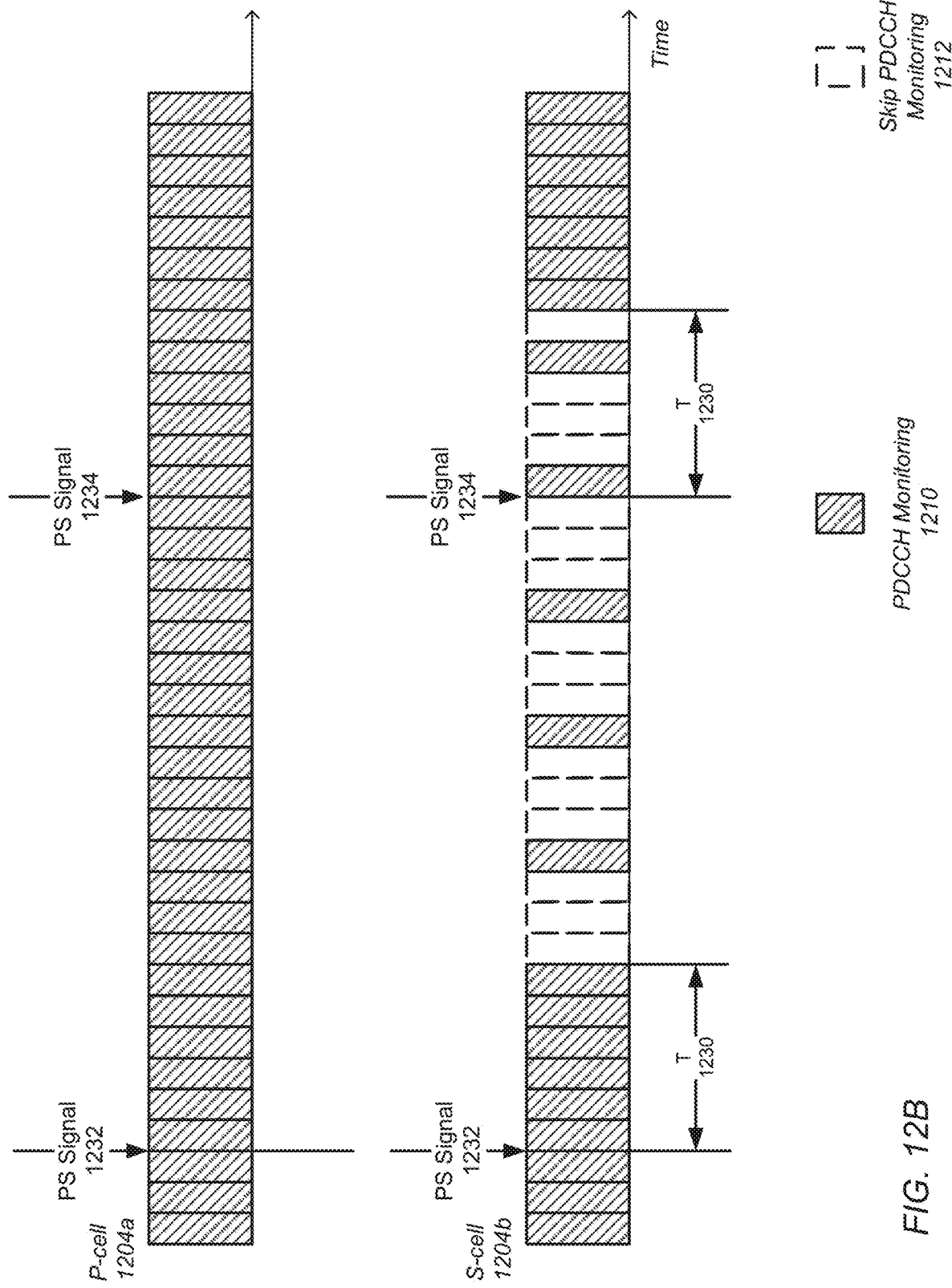
Figure 12C:
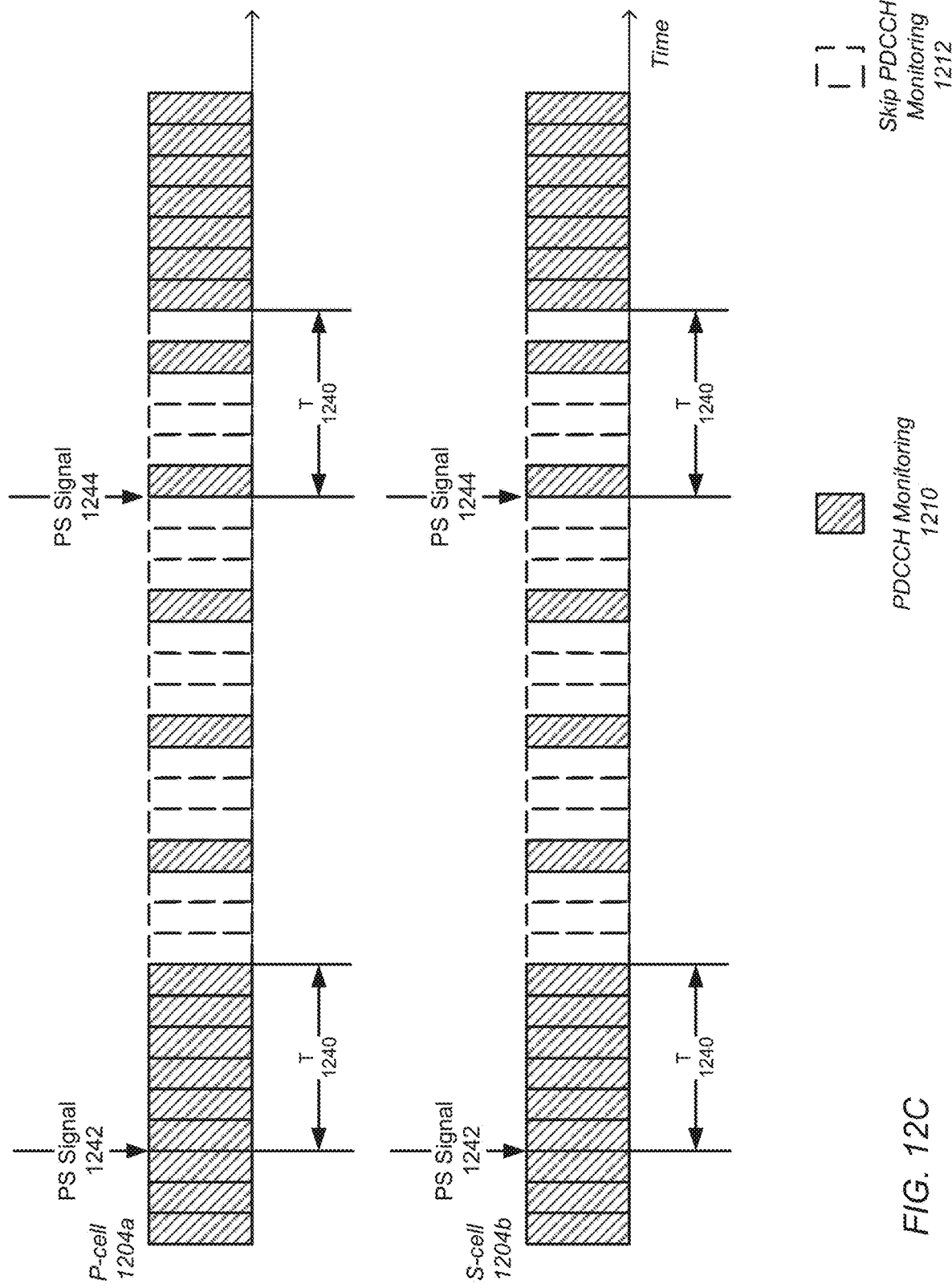

In some embodiments, a PS signal may be further configured to include a parameter indicating the gap between a power saving signal monitoring occasion and a change in PDCCH monitoring periodicity, a periodicity of PDCCH monitoring skipping or an indication of a periodicity chosen from a plurality of PDCCH monitoring periodicity, and an indication of a cell or set of cells (e.g., a primary (or master) cell and one or more secondary cells). For example, as illustrated by FIG. 12B, a UE, such as UE 106, may receive a PS signal 1232 from a base station, such as gNB 604. The PS signal 1232 may include a duration, T 1230, until start of a change in PDCCH monitoring periodicity, an indication of the PDCCH monitoring periodicity, and an indication of whether the PDCCH monitoring periodicity applies to p-cell 1204a and/or s-cell 1204b. As shown, the PS signal 1232 may indicate that the change applies to s-cell 1204b and not to p-cell 1204*a*. Thus, the UE may continue PDCCH monitoring 1210 on p-cell 1204*a* while changing PDCCH monitoring 1210 (e.g., skip PDCCH monitoring 1212) for s-cell 1204*b*. Further, as shown, upon receiving PS signal 1234, the UE may continue PDCCH monitoring based on PS signal 1232 for a time period 1230 before changing its PDCCH monitoring periodicity for s-cell 1204*b* (e.g., as indicated by PS signal 1234) based on PS signal 1234. As another example, as illustrated by FIG. 12C, a UE, such as UE 106, may receive a PS signal 1242 from a base station, such as gNB 604. The PS signal 1242 may include a duration, T 1240, until start of a change in PDCCH monitoring periodicity, an indication of the PDCCH monitoring periodicity, and an indication of whether the PDCCH monitoring periodicity applies to p-cell 1204*a* and/or s-cell 1204*b*. As shown, the PS signal 1242 may indicate that the change applies to p-cell 1204*a* and s-cell 1204*b*. Thus, after time period 1240, the UE change PDCCH monitoring 1210 (e.g., skip PDCCH monitoring 1212) for p-cell 1204*a* and s-cell 1204*b*, e.g., as indicated by PS signal 1242. Further, as shown, upon receiving PS signal 1244, the UE may continue PDCCH monitoring based on PS signal 1242 for the time period 1240 before changing its PDCCH monitoring periodicity for p-cell 1204*a* and s-cell 1204*b* (e.g., as indicated by PS signal 1244) based on PS signal 1244.

As another example, in some embodiments, a UE, such as UE 106, may be configured to monitor a power saving (PS) signal (or channel) which may be configured as a bandwidth part (BWP) switch indicator. In some embodiments, if the UE detects a PS signal indicating a different BWP, the UE may change its active BWP to to BWP indicated in the PS signal. In some embodiments, such a PS signal may trigger BWP switching in multiple cells. For example, PS signal based BWP switching could trigger change of an active BWP of a p-cell to a default BWP and an active BWP of one or more s-cells to their own default BWPs. In some embodiments, such switching of the BWP of the one or more s-cells this could be signaled explicitly or implicitly. In some embodiments, PS signal based BWP switching to p-cell's default BWP may also trigger deactivation/suspension of one or more s-cell(s). In some embodiments, a PS signal may be further configured to include a parameter indicating the gap between a PS signal monitoring occasion and a change in BWP. Additionally, in some embodiments, the gap (e.g., a period of time) between a power saving signal monitoring occasion and change in BWP may be pre-configured (e.g., via signaling between a base station, such as gNB 604 and the UE). In some embodiments, the pre-configuration may involve a negotiation between the UE and a base station, such as gNB 604. In some embodiments, the UE may request a minimum gap value and the base station may accommodate the UE with a gap time greater than or equal to the minimum gap value. In some embodiments, the base station may configure the gap time without input from the UE, e.g., based on a pre-configured and/or standardized value for the gap time.

As another example, in some embodiments, a UE, such as UE 106, may be configured to monitor a power saving (PS) signal (or channel) which may be configured as a bandwidth part (BWP) switch indicator. In some embodiments, if the UE detects a PS signal indicating a different BWP, the UE may change its active BWP to BWP indicated in the PS signal. In some embodiments, such a PS signal may trigger BWP switching in multiple cells. For example, PS signal based BWP switching could trigger change of an active BWP of a p-cell to a default BWP and an active BWP of one or more s-cells to their own default BWPs. In some embodiments, such switching of the BWP of the one or more s-cells this could be signaled explicitly or implicitly. In some embodiments, PS signal based BWP switching to p-cell's default BWP may also trigger deactivation/suspension of one or more s-cell(s). In some embodiments, a PS signal may be further configured to include a parameter indicating the gap between a PS signal monitoring occasion and a change in BWP. Additionally, in some embodiments, the gap (e.g., a period of time) between a power saving signal monitoring occasion and change in BWP may be pre-configured (e.g., via signaling between a base station, such as gNB 604 and the UE). In some embodiments, the pre-configuration may involve a negotiation between the UE and a base station, such as gNB 604. In some embodiments, the UE may request a minimum gap value and the base station may accommodate the UE with a gap time greater than or equal to the minimum gap value. In some embodiments, the base station may configure the gap time without input from the UE, e.g., based on a pre-configured and/or standardized value for the gap time.

As a further example, in some embodiments, a UE, such as UE 106, may be configured to monitor a power saving (PS) signal (or channel) which may be configured to indicate a minimum K0 value (K0_min) per bandwidth part (BWP) per component carrier, where K0 may be define as time distance between PDCCH and corresponding PDSCH in slots. In other words, a PS signal may be configured to specify a minimum K0 value per BWP per component carrier, where K0 may define a number of slots (e.g., from 0 to n) between a slot scheduled for the PDCCH and a slot scheduled for PDSCH. In some embodiments, if the UE detects a PS signal indicating minimum K0 values per BWP per component carrier, then the UE may expect to receive PDSCH based on only time domain resource allocation (TDRA) entries with K0 values larger than the minimum K0. In some embodiments, if the UE detects a PS signal indicating minimum K0 values per BWP per component carrier, then the UE may add the minimum K0 value indicated in the PS signal to all K0 values in TDRA entries. In some embodiments, if the UE does not detect a PS indicating a minimum K0 value per BWP per component carrier, then the UE may continue to use a most recently signaled minimum K0 value per BWP per component carrier.

In some embodiments, to aid a base station, such as gNB 604, in determination of correct K0 values, a UE, such as UE 106 may transmit (e.g., via RRC signaling) preferred K0 value per BWP and per component carrier to the base station. In addition, the UE may transmit a PDCCH decoding delay in each BWP in each component carrier to the base station. In such embodiments, the base station may determine K0 values based, at least in part, on the UE's transmitted preferences, subcarrier spacings of BWPs considered (e.g., BWPs preferred by the UE), PDCCH decoding delay (e.g., as specified by the UE) in the related BWPs, and/or whether the base station uses cross carrier scheduling.

As a further example, in some embodiments, a UE, such as UE 106, may be configured to monitor a power saving (PS) signal (or channel) which may be configured to indicate secondary cell (s-cell) activation, deactivation, and/or suspension. In some embodiments, if a UE detects a PS signal indicating s-cell activation, the UE may activate an indicated s-cell (or s-cells). In some embodiments, if the UE detects a PS signal indicating s-cell deactivation, the UE may deactivate an indicated s-cell (or s-cells). In some embodiments, if the UE detects a PS signal indicating s-cell suspension, the UE may switch an indicated s-cell (or s-cells) in a suspend mode. Note that in some embodiments, a suspend mode may be defined as a mode in which the UE may not expect to receive any data transmission but in which the UE may still monitor downlink channel status monitoring related signaling such as CSI-RS. Additionally, in some embodiments, a gap (e.g., a period of time) between a power saving (PS) signal monitoring occasion and s-cell mode change may be pre-configured (e.g., via signaling between a base station, such as gNB 604 and the UE). In some embodiments, the pre-configuration may involve a negotiation between the UE and a base station, such as gNB 604. In some embodiments, the UE may request a minimum gap value and the base station may accommodate the UE with a gap time greater than or equal to the minimum gap value. In some embodiments, the base station may configure the gap time without input from the UE, e.g., based on a pre-configured and/or standardized value for the gap time.

In some embodiments, one or more of the functionalities and/or configurations of a power saving (PS) signal described above may be configured simultaneously via radio resource control signaling between a UE, such as UE 106, and a base station, such as gNB 604, to support UE power savings. In some embodiments, if one or more functionalities/configurations are configured for a PS signal, then the PS signal may include (or carry) all associated parameters (or fields) until the PS signal is reconfigured. In other words, the PS signal may be configured to include any, any combination of, and/or all of the above described parameters/functionalities via RRC signaling. In addition, the PS signal may be reconfigured via RRC signaling to include any, any combination of, and/or all of the above described parameters/functionalities via RRC signaling.

For example, in some embodiments, a PS signal may be configured as a wake-up signal, a bandwidth part (BWP) indicator, a maximum number of MIMO layers indicator, and as an s-cell control. In such embodiments, a time gap between a wakeup signal and a start of a DRX "on" cycle (e.g., for PDCCH monitoring and/or PDSCH data reception) may accommodate UE activation of one or more s-cells (e.g., as indicated by the PS signal). Thus, the time gap may accommodate both UE modem warm up (e.g., for PDCCH monitoring and/or PDSCH data reception) and UE activation of the one or more s-cells. Thus, the PS signal may indicate whether UE needs to wake up, which BWP to monitor upon wake up, and a maximum number of MIMO layers in the indicated BWP in the indicates s-cells for activation. Note that applicability of the BWP indicator (or index) may depend on other jointly indicated signals, such as which s-cells are to be activated.

As another example, a PS signal may be configured as a wake-up signal and a PDCCH monitoring skipping signal. In such embodiments, the UE may interpret the PS signal based on a mode of the UE. Thus, if the UE is in an active mode (e.g., a DRX "on" cycle), the UE may interpret the PS signal as a PDCCH monitoring skipping signal. However, if the UE is not in the active mode (e.g., a DRX "off" cycle), the UE may interpret the PS signal as a wake-up signal. In other words, a functionality associated with the PS signal may be dependent upon a mode (or state) of the UE. Alternatively, in some embodiments, multiple PS signals may be configured via RRC signaling between a UE and a base station. In such embodiments, a first PS signal may be configured as a wake-up signal and a second PS signal may be configured as a PDCCH monitoring skipping indication. In such embodiments, a base station, such as gNB 604, may transmit the first PS signal when a UE, such as UE 106, is in a DRX "off" (or sleep) duration (or out of DRX "on" duration) and may transmit the second PS signal when the UE is in a DRX "on" duration (e.g., actively monitoring PDCCH) or when inactivity timer is running.

Figure 13A:
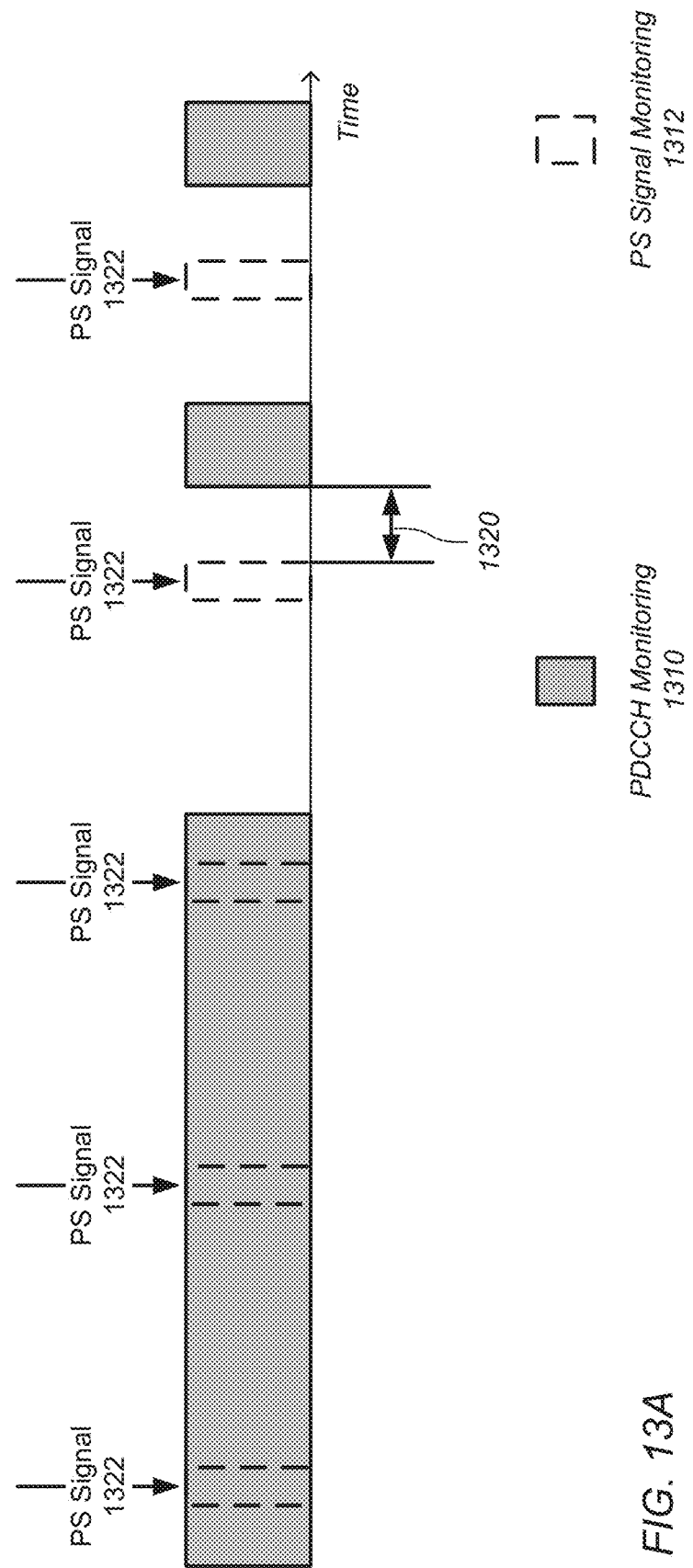
FIGS. 13A-13B illustrate examples of monitoring a power saving signal configured as a wake-up signal and a PDCCH monitoring skipping signal, according to some embodiments.

FIG. 13A illustrates one example of such a PS signal configuration (more precisely a single search space configuration for PS signal monitoring), according to some embodiments. As shown, a PS signal 1322 may be periodically received by a UE, such as UE 106, from a base station, such as gNB 604. As shown, when a PS signal 1322 is received during PDCCH monitoring 1310 (e.g., during a DRX "on" cycle), the UE may interpret the PS signal 1322 as a PDCCH monitoring skipping signal and skip one or more PDCCH monitoring opportunities based on the PS signal 1322. However, when a PS signal 1322 is received outside of PDCCH monitoring 1310 (e.g., during a DRX "off" duration), the UE may interpret the PS signal 1322 as a wake-up signal and, after a duration 1320, may resume PDCCH monitoring 1310 for a duration as specified in PS signal 1322 before re-entering (or resuming) a DRX "off" (or sleep) cycle.

Figure 13B:
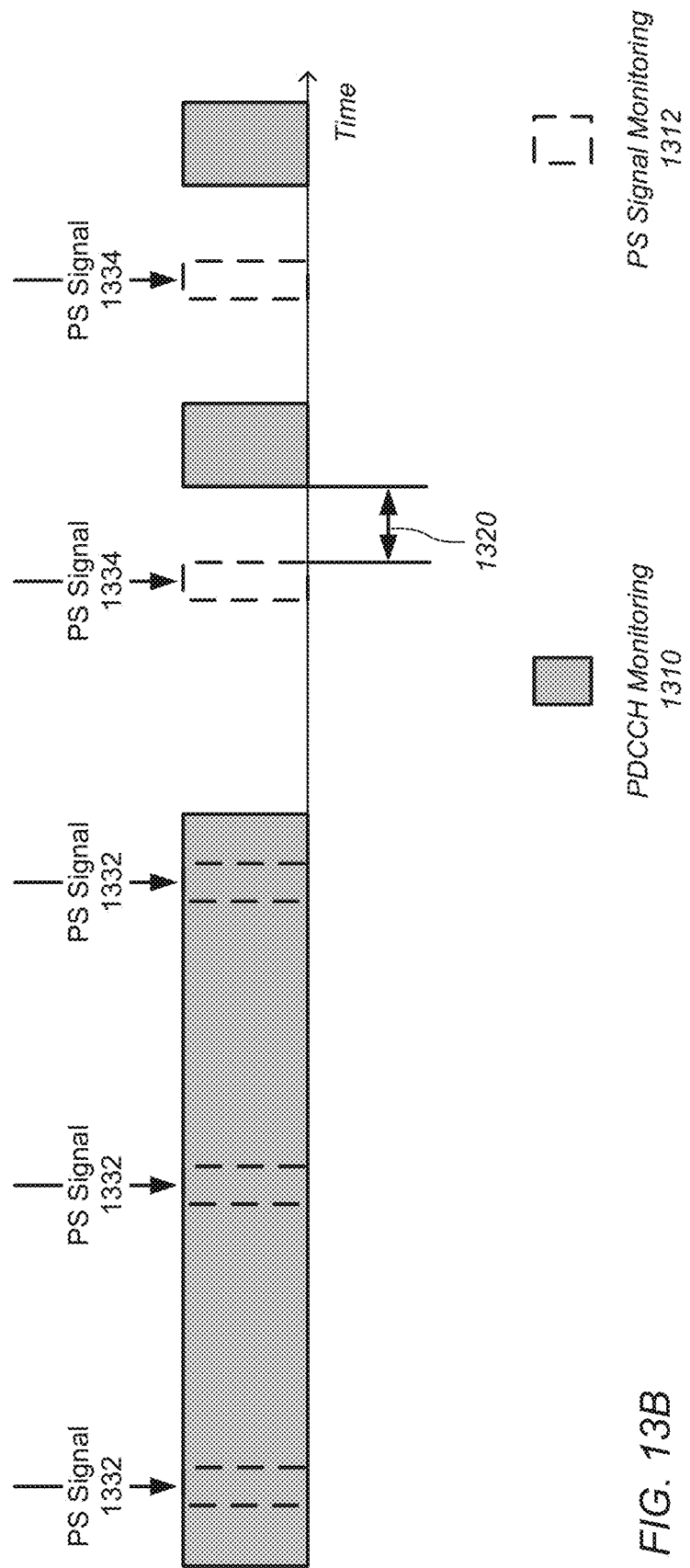

FIG. 13B illustrates another example of two PS signal configurations (more precisely two search space configurations; a first configuration for monitoring the PS signal as PDCCH monitoring skipping signal and a second configuration for monitoring PS signal as wake up signal), according to some embodiments. As shown, a PS signal may be periodically received by a UE, such as UE 106, from a base station, such as gNB 604. As shown, when a PS signal 1332 is received by the UE during PDCCH monitoring 1310 (e.g., during a DRX "on" cycle), the PS signal 1332 may be configured as PDCCH monitoring skipping PS signal. Additionally, when the PS signal 1334, which is monitored based on the second search space configuration (e.g., during a DRX "off" cycle), the PS signal 1334 may be configured as a wake-up PS signal.

As a further example, a PS signal may be configured as a PDCCH monitoring skipping signal and an s-cell control signal. In such embodiments, a PS signal may indicate PDCCH monitoring skipping duration and PDCCH monitoring periodicity to be used thereafter as well as s-cell activation/deactivation/suspension. In some embodiments, PDCCH monitoring skipping signal and s-cell control may be jointly encoded to save signaling overhead. For example, FIG. 14 illustrates examples of possible values of a PS signal and associated indications for p-cell and s-cell control, according to some embodiments. As shown, a joint signal value of '000' may indicate no PDCCH monitoring skipping for a p-cell and instruct a UE to resume monitoring of an s-cell (or s-cells) if stopped and/or activate an s-cell (or s-cells) if deactivated. A value of '001' may indicate 5 milliseconds of PDCCH monitoring skipping for the p-cell and 5 milliseconds of PDCCH monitoring skipping for the s-cell (or s-cells). A value of '010' may indicate 10 milliseconds of PDCCH monitoring skipping for the p-cell and 20 milliseconds of PDCCH monitoring skipping for the s-cell (or s-cells). A value of '011' may indicate 20 milliseconds of PDCCH monitoring skipping for the p-cell and 40 milliseconds of PDCCH monitoring skipping for the s-cell (or s-cells). A value of '100' may indicate 30 milliseconds of PDCCH monitoring skipping for the p-cell and suspension of the s-cell (or s-cells). A value of '111' may indicate 40 milliseconds of PDCCH monitoring skipping for the p-cell and deactivation of the s-cell (or s-cells).

As another example, a PS signal may be configured as a bandwidth part (BWP) indicator and an s-cell control signal. In such embodiments, a PS signal may indicate BWP for both p-cell and s-cell (or s-cells) as well as s-cell activation/ deactivation/suspension. In some embodiments, BWP indication and s-cell control may be jointly encoded to save signaling overhead and/or to capture most likely configurations. For example, FIG. 15 illustrates examples of possible values of a PS signal and associated indications for p-cell and s-cell control, according to some embodiments. As shown, a joint signal value of '000' may indicate default BWP for a p-cell and instruct a UE to deactivate an s-cell (or s-cells). A value of '001' may indicate default BWP for the p-cell and suspension of the s-cell (or s-cells). A value of '010' may indicate BWP1 for the p-cell and suspension of the s-cell (or s-cells). A value of '011' may indicate BWP2 for the p-cell and suspension of the s-cell (or s-cells). A value of '100' may indicate BWP2 for the p-cell and default BWP for the s-cell (or s-cells). A value of '101' may indicate BWP2 for the p-cell and BWP2 for the s-cell (or s-cells).

Figure 16:
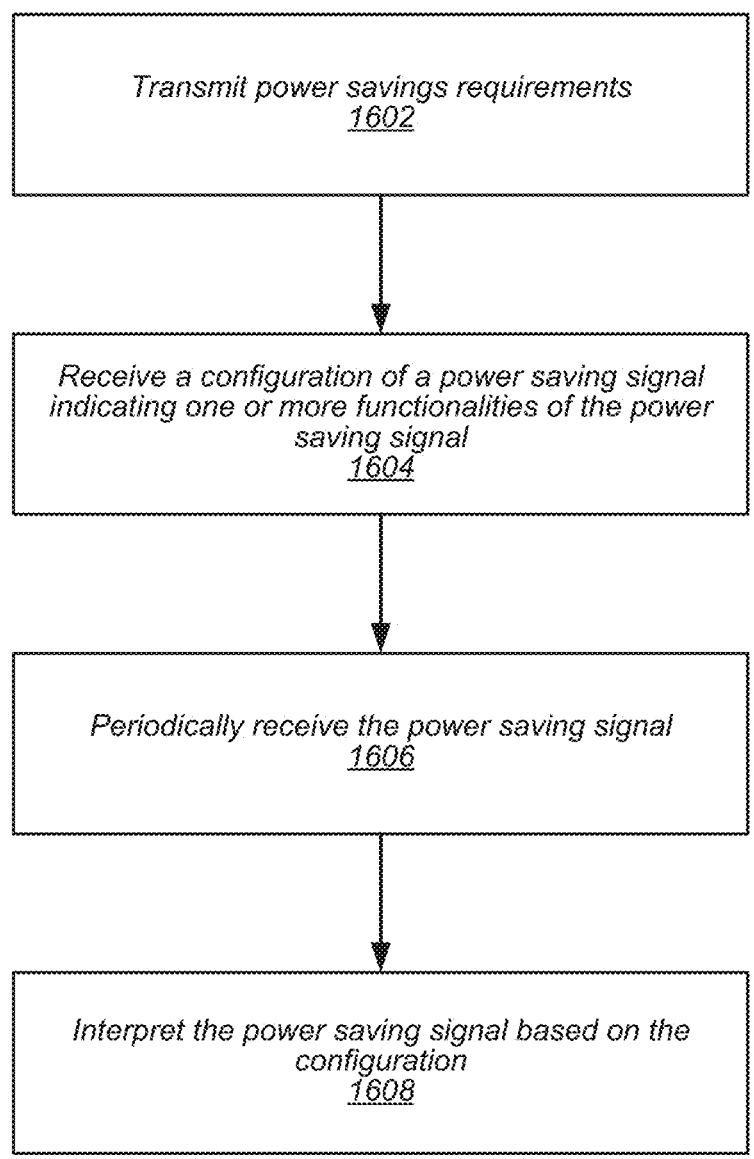
FIGS. 16-18 illustrate examples of block diagrams of methods for configuring a power savings signal, according to some embodiments.

FIG. 16 illustrates a block diagram of an example of a method for configuring a power savings signal, according to some embodiments. The method shown in FIG. 16 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1602, a UE, such as UE 106, may transmit power savings requirements to a base station, such as base station 102 and/or gNB 604.

At 1604, the UE may receive, from the base station, a configuration of a power saving signal. In some embodiments, the configuration may indicate one or more functionalities of the power saving signal. In some embodiments, the configuration of the power saving signal may be received via radio resource control signaling. In some embodiments, the configuration may be negotiated between the UE and the base station. In such embodiments, the negotiation may include the UE requesting a minimum gap between receipt of the power saving signal and an action indicated by the functionality of the power saving signal. In some embodiments, a parameter included in the power saving signal may indicate a gap between receipt of the power saving signal and an action indicated by the functionality of the power saving signal that is greater than or equal to the minimum gap. In some embodiments, the one or more functionalities may include any, any combination of, and/or all of the power saving signal functioning as a wake-up signal, the power saving signal functioning as a physical downlink control channel (PDCCH) monitoring skipping signal, the power saving signal functioning as a PDCCH monitoring periodicity change signal, the power saving signal functioning as a bandwidth part (BWP) switching indicator, the power saving signal functioning as a maximum number of multiple input multiple output (MIMO) layer indicator, the power saving signal functioning as a minimum K0 indicator, where K0 may indicate a number of slots between a slot scheduled for the PDCCH and a slot scheduled for a physical downlink shared channel (PDSCH), and/or the power saving signal functioning as a secondary cell control indicator.

In some embodiments, when the power saving signal functions as a wake-up signal, the power saving signal may include a first parameter indicating a time gap between receipt of the power saving signal and a wake-up start time. In some embodiments, the power saving signal may also include a second parameter indicating a number of power on cycles to skip when the UE does not receive a power savings signal. In some embodiments, the power saving signal may further include a third parameter indicating a scheduling downlink control index (DCI).

In some embodiments, when the power saving signal functions as a PDCCH monitoring skipping signal, the power saving signal may include a first parameter indicating a time gap between receipt of the power saving signal and a start of the PDCCH monitoring skipping. In some embodiments, the power saving signal may also include a second parameter indicating a sleep duration from a set of sleep durations. In some embodiments, the power saving signal may further include a third parameter indicating a set of cells to skip monitoring PDCCH. In some embodiments, the set of cells may include a primary cell and one or more secondary cells.

In some embodiments, when the power saving signal functions as a PDCCH periodicity change signal, the power saving signal may include a first parameter indicating a time gap between receipt of the power saving signal and a start of the PDCCH periodicity change. In some embodiments, the power saving signal may also include a second parameter indicating a PDCCH monitoring periodicity from a set of PDCCH monitoring periodicities. In some embodiments, the power saving signal may further include a third parameter indicating a set of cells the change in PDCCH monitoring periodicity applies to. In some embodiments, the set of cells may include a primary cell and one or more secondary cells.

In some embodiments, when the power saving signal functions as a bandwidth part (BWP) switching indicator, the power saving signal may include a first parameter indicating a time gap between receipt of the power saving signal and a switch of the BWP. In some embodiments, the power saving signal may also include a second parameter indicating the BWP. In some embodiments, the power saving signal may further include a third parameter indicating a set of cells the BWP applies to. In some embodiments, the set of cells may include a primary cell and one or more secondary cells.

In some embodiments, when the power saving signal functions as a maximum number of multiple input multiple output (MIMO) layer indicator, the power saving signal may include a first parameter indicating a time gap between receipt of the power saving signal and a switch of the maximum number of MIMO layers. In some embodiments, the power saving signal may also include a second parameter indicating the maximum number of MIMO layers. In some embodiments, the power saving signal may further include a third parameter indicating a set of cells the maximum number of MIMO layers applies to. In some embodiments, the set of cells may include a primary cell and one or more secondary cells.

In some embodiments, when the power saving signal functions as a minimum K0 indicator per bandwidth part and/or per component carrier, the power saving signal may include a first parameter indicating a time gap between receipt of the power saving signal and a switch of the minimum K0. In some embodiments, the power saving signal may also include a second parameter indicating the minimum K0. In some embodiments, K0 may indicate a number of slots between a slot scheduled for the PDCCH and a slot scheduled for a physical downlink shared channel (PDSCH). In some embodiments, the power saving signal may further include a third parameter indicating a set of cells the minimum K0 applies to. In some embodiments, the set of cells may include a primary cell and one or more secondary cells. In some embodiments, the UE may interpret the minimum K0 as an offset. In such embodiments, the UE may add the minimum K0 to all K0 values.

In some embodiments, when the power saving signal functions as a secondary cell control indicator, the power saving signal may include a first parameter indicating a time gap between receipt of the power saving signal and a switch in a mode of the secondary cell. In some embodiments, the power saving signal may also include a second parameter indicating one or more secondary cells to switch. In some embodiments, the modes may include activation, deactivation, and/or suspension.

In some embodiments, the power saving signal may function as a wake-up signal, a bandwidth part (BWP) indicator, a maximum number of multiple-input-multiple-output (MIMO) layer indicator, and a secondary cell control indicator. In such embodiments, the power saving signal may include a first parameter indicating a time gap between receipt of the power saving signal and a switch in a mode of the secondary cell, a second parameter indicating one or more secondary cells to switch, a third parameter indicating a maximum number of MIMO layers, and a fourth parameter indicating BWP. In some embodiments, the power saving signal may further include a fifth parameter indicating to which secondary cells the maximum number of MIMO layers and BWP are applicable.

In some embodiments, the power saving signal may function as a wake-up signal and a PDCCH monitoring skipping signal. In some embodiments, when the UE is in an active mode, the UE may interpret the power saving signal as a PDCCH monitoring skipping signal. In some embodiments, when the UE is not in the active mode, the UE may interpret the power saving signal as a wake-up signal. In some embodiments, the power saving signal may include a first parameter indicating a time gap between receipt of the power saving signal and a wake-up start time or a start of the PDCCH monitoring skipping, a second parameter indicating a number of power on cycles to skip when the wireless device does not receive a power savings signal, and a third parameter indicating a sleep duration from a set of sleep durations.

In some embodiments, the power saving signal may function as a PDCCH monitoring skipping signal and a secondary cell control indicator. In such embodiments, the power saving signal may include a first parameter indicating a time gap between receipt of the power saving signal and a start of the PDCCH monitoring skipping, a second parameter indicating PDCCH monitoring periodicity, and a third parameter indicating secondary cell mode. In some embodiments, the modes may include activation, deactivation, and suspension. In some embodiments, the PDCCH monitoring skipping and secondary control indicator may be jointly encoded to reduce signaling overhead.

In some embodiments, the power saving signal may function as a bandwidth part (BWP) indicator and a secondary cell control indicator. In some embodiments, the BWP and secondary cell control may be jointly encoded to reduce signaling overhead.

At 1606, the UE may periodically receive, from the base station, the power saving signal.

At 1608, the UE may interpret the power saving signal based on the configuration.

Figure 17:
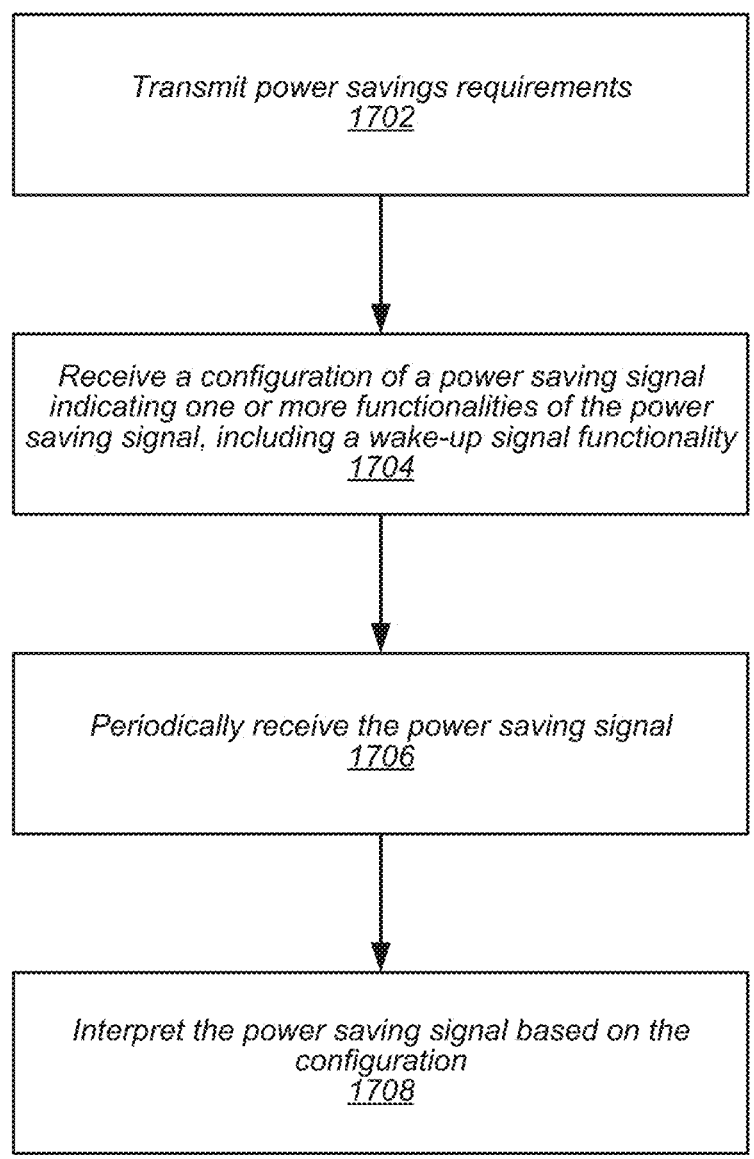

FIG. 17 illustrates a block diagram of an example of a method for configuring a power savings signal, according to some embodiments. The method shown in FIG. 17 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1702, a UE, such as UE 106, may transmit power savings requirements to a base station, such as base station 102 and/or gNB 604.

At 1704, the UE may receive, from the base station, a configuration of a power saving signal. In some embodiments, the configuration may indicate one or more functionalities of the power saving signal. In some embodiments, the configuration of the power saving signal may be received via radio resource control signaling. In some embodiments, the configuration may be negotiated between the UE and the base station. In such embodiments, the negotiation may include the UE requesting a minimum gap between receipt of the power saving signal and an action indicated by the functionality of the power saving signal. In some embodiments, a parameter included in the power saving signal may indicate a gap between receipt of the power saving signal and an action indicated by the functionality of the power saving signal that is greater than or equal to the minimum gap. In some embodiments, the power saving signal may function as a wake-up signal and may include a first parameter indicating a time gap between receipt of the power saving signal and a wake-up start time. In some embodiments, the power saving signal may also include a second parameter indicating a number of power on cycles to skip when the UE does not receive a power savings signal. In some embodiments, the power saving signal may further include a third parameter indicating a scheduling downlink control index (DCI).

In some embodiments, the power saving signal may further function as a bandwidth part (BWP) indicator, a maximum number of multiple-input-multiple-output (MIMO) layer indicator, and a secondary cell control indicator. In such embodiments, the power saving signal may include a first parameter indicating a time gap between receipt of the power saving signal and a switch in a mode of the secondary cell, a second parameter indicating one or more secondary cells to switch, a third parameter indicating a maximum number of MIMO layers, and a fourth parameter indicating BWP. In some embodiments, the power saving signal may further include a fifth parameter indicating to which secondary cells the maximum number of MIMO layers and BWP are applicable.

In some embodiments, the power saving signal may also function as a PDCCH monitoring skipping signal. In some embodiments, when the UE is in an active mode, the UE may interpret the power saving signal as a PDCCH monitoring skipping signal. In some embodiments, when the UE is not in the active mode, the UE may interpret the power saving signal as a wake-up signal. In some embodiments, the power saving signal may include a first parameter indicating a time gap between receipt of the power saving signal and a wake-up start time or a start of the PDCCH monitoring skipping, a second parameter indicating a number of power on cycles to skip when the wireless device does not receive a power savings signal, and a third parameter indicating a sleep duration from a set of sleep durations.

At 1706, the UE may periodically receive, from the base station, the power saving signal.

At 1708, the UE may interpret the power saving signal based on the configuration.

Figure 18:
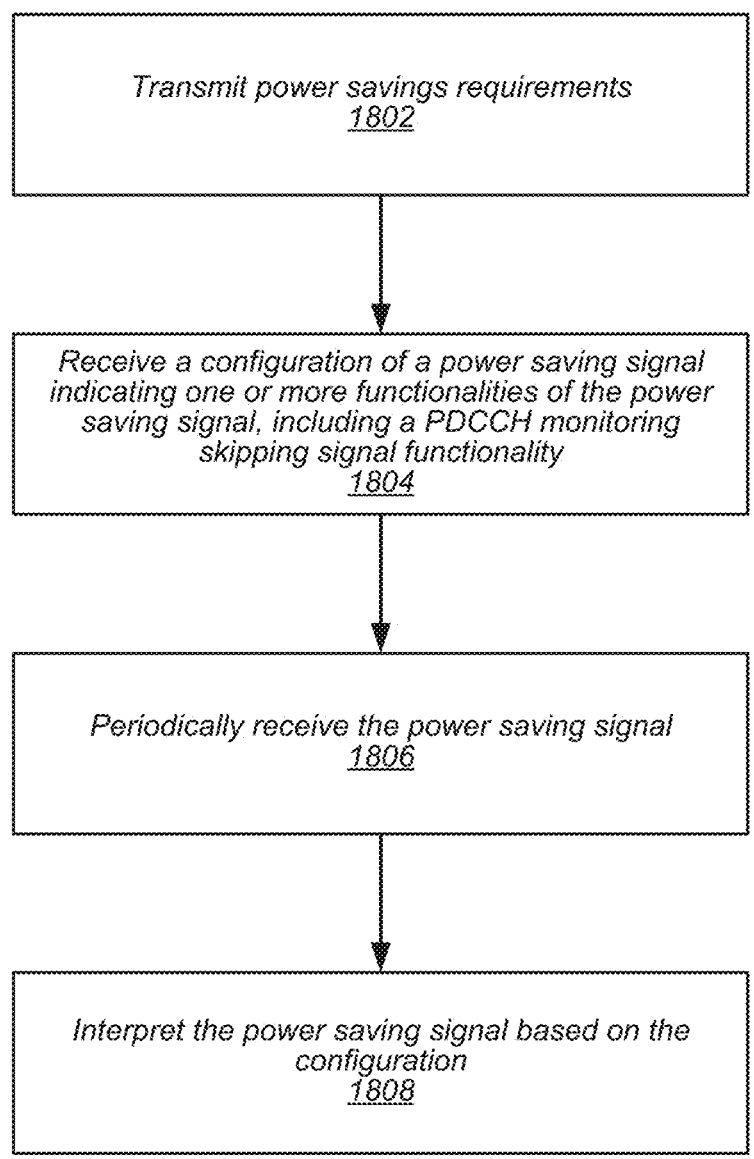

FIG. 18 illustrates a block diagram of an example of a method for configuring a power savings signal, according to some embodiments. The method shown in FIG. 18 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1802, a UE, such as UE 106, may transmit power savings requirements to a base station, such as base station 102 and/or gNB 604.

At 1804, the UE may receive, from the base station, a configuration of a power saving signal. In some embodiments, the configuration may indicate one or more functionalities of the power saving signal. In some embodiments, the configuration of the power saving signal may be received via radio resource control signaling. In some embodiments, the configuration may be negotiated between the UE and the base station. In such embodiments, the negotiation may include the UE requesting a minimum gap between receipt of the power saving signal and an action indicated by the functionality of the power saving signal. In some embodiments, a parameter included in the power saving signal may indicate a gap between receipt of the power saving signal and an action indicated by the functionality of the power saving signal that is greater than or equal to the minimum gap. In some embodiments, the power saving signal may function as a PDCCH monitoring skipping signal and may include a first parameter indicating a time gap between receipt of the power saving signal and a start of the PDCCH monitoring skipping. In some embodiments, the power saving signal may also include a second parameter indicating a sleep duration from a set of sleep durations. In some embodiments, the power saving signal may further include a third parameter indicating a set of cells to skip monitoring PDCCH. In some embodiments, the set of cells may include a primary cell and one or more secondary cells.

In some embodiments, the power saving signal may further function as a wake-up signal. In some embodiments, when the UE is in an active mode, the UE may interpret the power saving signal as a PDCCH monitoring skipping signal. In some embodiments, when the UE is not in the active mode, the UE may interpret the power saving signal as a wake-up signal. In some embodiments, the power saving signal may include a first parameter indicating a time gap between receipt of the power saving signal and a wake-up start time or a start of the PDCCH monitoring skipping, a second parameter indicating a number of power on cycles to skip when the wireless device does not receive a power savings signal, and a third parameter indicating a sleep duration from a set of sleep durations.

In some embodiments, the power saving signal may further function as a secondary cell control indicator. In such embodiments, the power saving signal may include a first parameter indicating a time gap between receipt of the power saving signal and a start of the PDCCH monitoring skipping, a second parameter indicating PDCCH monitoring periodicity, and a third parameter indicating secondary cell mode. In some embodiments, the modes may include activation, deactivation, and suspension. In some embodiments, the PDCCH monitoring skipping and secondary control indicator may be jointly encoded to reduce signaling overhead.

At 1806, the UE may periodically receive, from the base station, the power saving signal.

At 1808, the UE may interpret the power saving signal based on the configuration.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
at least one antenna;
at least one radio, wherein the at least one radio is configured to perform cellular communication using at least one radio access technology (RAT); and
one or more processors coupled to the at least one radio, wherein the one or more processors and the at least one radio are configured to perform voice and/or data communications;
wherein the one or more processors are configured to cause the UE to:
receive, from a base station, a configuration of a power saving signal via radio resource control (RRC) signaling, wherein the configuration indicates one or more functionalities of the power saving signal, wherein the power saving signal functions as a wake-up signal, and wherein, when the wake-up signal is not received, a discontinuous reception cycle (DRX) on-duration is skipped by the UE;
request, from the base station, a minimum gap value of a gap between a power saving signal monitoring occasion for the power saving signal and a start of the DRX on duration;
receive, from the base station, signaling configuring the gap;

monitor, from the base station before the DRX on-duration and during the power saving signal monitoring occasion, the power saving signal; and interpret the power saving signal based on the configuration.

2. The UE of claim 1,
wherein the functionality of the power saving signal depends on UE capability.

3. The UE of claim 1,
wherein the functionality of the power saving includes a secondary cell (Scell) indication.

4. The UE of claim 3,
wherein the Scell indication indicates one of activation, deactivation, or suspension of an Scell.

5. The UE of claim 4,
wherein the Scell indication applies to the Scell and not a primary cell (PCell).

6. The UE of claim 3,
wherein the Scell indication includes an indication of a bandwidth part (BWP) for an SCell.

7. The UE of claim 1,
wherein the UE is in connected mode.

8. An apparatus, comprising:
a memory; and
at least one processor in communication with the memory;
wherein the at least one processor is configured to:
receive, from a base station, a configuration of a power saving signal via radio resource control (RRC) signaling, wherein the configuration indicates one or more functionalities of the power saving signal, wherein the power saving signal functions as a wake-up signal, and wherein, when the wake-up signal is not received, a discontinuous reception cycle (DRX) on-duration is skipped;

request, from the base station, a minimum gap value of a gap between a power saving signal monitoring occasion for the power saving signal and a start of the DRX on duration;

receive, from the base station, signaling configuring the gap;

monitor, from the base station before the DRX on-duration and during the power saving signal monitoring occasion, the power saving signal; and interpret the power saving signal based on the configuration.

9. The apparatus of claim 8,
wherein the functionality of the power saving signal depends on a capability associated with the apparatus.

10. The apparatus of claim 8,
wherein the functionality of the power saving includes a secondary cell (Scell) indication.

11. The apparatus of claim 10,
wherein the Scell indication indicates one of activation, deactivation, or suspension of an Scell.

12. The apparatus of claim 11,
wherein the Scell indication applies to the Scell and not a primary cell (PCell).

13. The apparatus of claim 10,
wherein the Scell indication includes an indication of a bandwidth part (BWP) for an SCell.

14. A method, comprising:
a user equipment device (UE),
receiving, from a base station, a configuration of a power saving signal via radio resource control (RRC) signaling, wherein the configuration indicates one or more functionalities of the power saving signal, wherein the power saving signal functions as a wake-up signal, and wherein, when the wake-up signal is not received, a discontinuous reception cycle (DRX) on-duration is skipped by the UE;

requesting, from the base station, a minimum gap value of a gap between a power saving signal monitoring occasion for the power saving signal and a start of the DRX on duration;

receiving, from the base station, signaling configuring the gap;

monitoring, from the base station before the DRX on-duration and during the power saving signal monitoring occasion, the power saving signal; and interpreting the power saving signal based on the configuration.

15. The method of claim 14,
wherein the functionality of the power saving signal depends on UE capability.

16. The method of claim 15, further comprising:
the UE,
transmitting, to the base station, an indication of the UE capability.

17. The method of claim 14,
wherein the functionality of the power saving includes a secondary cell (Scell) indication.

18. The method of claim 17,
wherein the Scell indication indicates one of activation, deactivation, or suspension of an Scell, and wherein the Scell indication applies to the Scell and not a primary cell (PCell).

19. The method of claim 17,
wherein the Scell indication includes an indication of a bandwidth part (BWP) for an SCell.

20. The method of claim 14,
wherein the UE is in connected mode.

* * * * *